US010762524B2

(12) United States Patent
Poynter et al.

(10) Patent No.: US 10,762,524 B2
(45) Date of Patent: Sep. 1, 2020

(54) DATA PLATFORM AND ANALYTICS FOR PREDICTING MEDIA METRICS

(71) Applicant: Accenture Global Solutions Limited, Dublin (IE)

(72) Inventors: Nicola Sarah Vanessa Poynter, Hampshire (GB); Suchit Malhotra, Haryana (IN); Rahul Jairath, New Delhi (IN); Shaifali Panwar, New Delhi (IN); Saurabh Kumar Singh, Ghaziabad (IN); Julian Richard Taverner Smith, Surrey (GB)

(73) Assignee: Accenture Global Solutions Limited, Dublin (IE)

( * ) Notice: Subject to any disclaimer, the term of this patent is extended or adjusted under 35 U.S.C. 154(b) by 177 days.

(21) Appl. No.: 16/049,405

(22) Filed: Jul. 30, 2018

(65) Prior Publication Data
US 2020/0034873 A1    Jan. 30, 2020

(51) Int. Cl.
*G06Q 30/00* (2012.01)
*G06Q 30/02* (2012.01)
(52) U.S. Cl.
CPC ..... *G06Q 30/0244* (2013.01); *G06Q 30/0249* (2013.01)
(58) Field of Classification Search
USPC .................................................... 705/14, 319
See application file for complete search history.

(56) References Cited

U.S. PATENT DOCUMENTS

2014/0046777 A1* 2/2014 Markey .............. G06Q 30/02
                                                         705/14.66
2015/0180989 A1* 6/2015 Seth ................. G06Q 30/0277
                                                         709/224

OTHER PUBLICATIONS

Effects of Price and Advertising in Test-Market Experiments, Gerald J. Eskin and Penny H. Baron (Year: 1977).*
Real-time performance monitoring for an enterprise information management system, Trieu C. Chieu and Liangzhao Zeng (Year: 2008).*

* cited by examiner

*Primary Examiner* — Gautam Ubale
(74) *Attorney, Agent, or Firm* — Harrity & Harrity, LLP

(57) ABSTRACT

A device obtains data, for a current media plan, that includes a cost adjustment factor, a duration of an unexecuted portion of the current media plan that is divisible into periods of time, and an unutilized budget, for the duration, that is divisible into budget portions based on the periods of time. The device generates a predictive baseline cost parameter by adjusting, by the cost adjustment factor, a baseline cost parameter of a previously implemented baseline media plan. The device predicts cost metrics for the current media plan using the predictive baseline cost parameter, and predicts performance metrics for the current media plan based on the cost metrics and predictive baseline cost parameter. The device determines target cost per point (CPP) values for the current media plan based on the cost metrics and performance metrics, and causes an action to be performed based on the target CPP values.

20 Claims, 13 Drawing Sheets

DATA PLATFORM AND ANALYTICS FOR PREDICTING MEDIA METRICS

BACKGROUND

Effective marketing, based on implementing a well-researched media plan (e.g., media campaign), can set a business apart from the crowd. Monitoring media plan data, and analyzing the resultant media plan metrics, is essential for gauging the effectiveness of a media plan. Such metrics may include, for example, gross rating points (GRPs), click-through rates (CTRs), and/or metrics relating to the media plan reach, recall, and/or engagement.

SUMMARY

According to some possible implementations, a method may include obtaining, by a device, data associated with a current media plan that is being implemented, wherein the data includes a cost adjustment factor based on at least one of a seasonality input, an inflation input, or a quality input, a duration of an unexecuted portion of the current media plan, wherein the duration is divisible into one or more periods of time, and an unutilized budget for the duration of the unexecuted portion of the current media plan, wherein the unutilized budget is divisible into one or more budget portions based on the one or more periods of time. The method may include obtaining, by the device, a baseline cost parameter associated with a previously implemented baseline media plan, and generating, by the device, a predictive baseline cost parameter based on obtaining the baseline cost parameter, wherein generating the predictive baseline cost parameter includes adjusting the baseline cost parameter by the cost adjustment factor. The method may include predicting, by the device, one or more cost metrics associated with the current media plan using the predictive baseline cost parameter, wherein predicting the one or more cost metrics includes modifying an amount of the one or more budget portions by a proportionate amount of the predictive baseline cost parameter, based on a total number of the one or more budget portions. The method may include predicting, by the device, one or more performance metrics for the current media plan based on predicting the one or more cost metrics, wherein predicting the one or more performance metrics includes modifying the one or more cost metrics by the predictive baseline cost parameter. The method may include determining, by the device, one or more target cost per point (CPP) values for the current media plan based on the one or more cost metrics and the one or more performance metrics, and causing, by the device, an action to be performed based on determining the one or more target CPP values.

According to some possible implementations, a device may include one or more memories, and one or more processors, communicatively coupled to the one or more memories, to obtain data associated with a current media plan that is being implemented, wherein the data includes a cost adjustment factor based on at least one of a seasonality input, an inflation input, or a quality input, a duration of an unexecuted portion of the current media plan, wherein the duration is divisible into one or more periods of time, and an unutilized budget for the duration of the unexecuted portion of the current media plan, wherein the unutilized budget is divisible into one or more budget portions corresponding to the one or more periods of time. The one or more processors may obtain a baseline cost parameter associated with a previously implemented baseline media plan, and generate a predictive baseline cost parameter based on the baseline cost parameter to predict one or more metrics associated with the current media plan, wherein the predictive baseline cost parameter is generated by adjusting the baseline cost parameter by the cost adjustment factor. The one or more processors may obtain an actual cost associated with an executed portion of the current media plan, and determine an amount of savings based on adjusting the actual cost by the predicted baseline cost parameter. The one or more processors may adjust the unutilized budget to include the amount of savings, and predict one or more cost metrics associated with the current media plan based on adjusting the unutilized budget, wherein the one or more cost metrics are predicted by modifying an amount of the one or more budget portions, including the amount of savings, by a proportionate amount of the predictive baseline cost parameter, based on a total number of the one or more budget portions. The one or more processors may predict one or more performance metrics for the current media plan based on predicting the one or more cost metrics, wherein the one or more performance metrics are predicted by modifying the one or more cost metrics by the predictive baseline cost parameter. The one or more processors may determine one or more target CPP values for the current media plan based on the one or more cost metrics and the one or more performance metrics, and cause an action to be performed based on determining the one or more target CPP values.

According to some possible implementations, a non-transitory computer-readable medium may store instructions that include one or more instructions that, when executed by one or more processors of a device, cause the one or more processors to obtain data associated with a current media plan that is being implemented, wherein the data includes a first cost adjustment factor based on at least one of a first seasonality input, a first inflation input, or a first quality input associated with a first group specified in the current media plan, a second cost adjustment factor based on at least one of a second seasonality input, a second inflation input, or a second quality input associated with a second group specified in the current media plan, a duration of an unexecuted portion of the current media plan, wherein the duration is divisible into one or more periods of time, and an unutilized budget for the duration of the unexecuted portion of the current media plan, wherein a first portion of the unutilized budget is allocated to the first group and a second portion of the unutilized budget is allocated to the second group, wherein the first portion of the unutilized budget is divisible into one or more first budget portions for the one or more periods of time, and wherein the second portion of the unutilized budget is divisible into one or more second budget portions for the one or more periods of time, obtain a baseline cost parameter associated with a previously implemented baseline media plan. The one or more instructions may cause the one or more processors to generate a first predictive baseline cost parameter to predict one or more first metrics associated with the first group, wherein generating the first predictive baseline cost parameter includes adjusting the baseline cost parameter by the first cost adjustment factor, and to generate a second predictive baseline cost parameter to predict one or more second metrics associated with the second group, wherein generating the second predictive baseline cost parameter includes adjusting the baseline cost parameter by the second cost adjustment factor. The one or more instructions may cause the one or more processors to predict one or more first cost metrics associated with the first group specified in the current media plan, wherein predicting the one or more first cost metrics includes modifying an amount of the one or more first budget portions by a proportionate amount of the first predictive baseline cost parameter, based on a total number of the one or more first budget portions. The one or more instructions may cause the one or more processors to predict one or more second cost metrics associated with the second group specified in the current media plan, wherein predicting the one or more second cost metrics includes modifying an amount of the one or more second budget portions by a proportionate amount of the second predictive baseline cost parameter, based on a total number of the one or more second budget portions. The one or more instructions may cause the one or more processors to predict one or more first performance metrics based on modifying the one or more first cost metrics by the first predictive baseline cost parameter, and to predict one or more second performance metrics based on modifying the one or more second cost metrics by the second predictive baseline cost parameter. The one or more instructions may cause the one or more processors to determine one or more first target CPP values for the first group based on the one or first more cost metrics and the one or more first performance metrics, determine one or more second target CPP values for the second group based on the one or more second cost metrics and the one or more second performance metrics, and cause an action to be performed based on the one or more first target CPP values and the one or more second CPP values.

DETAILED DESCRIPTION

The following detailed description of example implementations refers to the accompanying drawings. The same reference numbers in different drawings may identify the same or similar elements.

Business clients engage media agencies for planning and executing media campaigns, or media plans, including marketing, advertising, and promotional plans. A media agency defines a media plan based on a client's budget and goals, and specifies quality commitments that the media agency agrees to deliver to the client. Existing media platforms facilitate media plan formation by way of providing planning and project management tools. Such platforms allow the media agency to share progress reports with the client; however, the progress reports lack intelligent insight regarding a future (e.g., unexecuted portion) of a current media plan. For example, the client has no analytical insight into performance metrics and/or efficiency metrics associated with the future of the current media plan, by which to modify, redefine, and/or update the media plan prior to expiration of the media plan.

Some implementations described herein provide a media performance platform, including a predictive engine that is configured to perform rigorous data analytics, for predicting efficiency metrics associated with a future of a currently executing media plan. In this way, a user may have a finger on the pulse of the currently executing media plan, at various levels of granularity (e.g., country, channel, audience, and/or the like), as well as having predictive insight regarding the future of the currently executing media plan, by which to target performance, optimize spending, and/or the like. The predictive engine may also facilitate scenario planning (i.e., "what-if" planning), based on historic (e.g., baseline) media plan data and currently executing media plan data, whereby the user may adjust quality inputs, budget allocation, and/or the like, to dynamically predict alternative metrics for the currently executing media plan. In this way, the user may gain intelligent insight into alternative scenarios that may be achievable for the future of a currently executing media plan, by which the user may elect to change a course in which the currently executing media plan is headed, and pursue one of the alternative scenarios. In this way, computing resources (e.g., processing resources, memory resources, and/or the like) devoted to determining, generating, presenting, and/or reporting extraneous, non-insightful media data may be obviated. Currently, there does not exist a technique for employing analytics to make intelligent predictions for future metrics associated with a currently executing media plan, by which the plan may be modified, redefined, and/or the like.

Figure 1A:
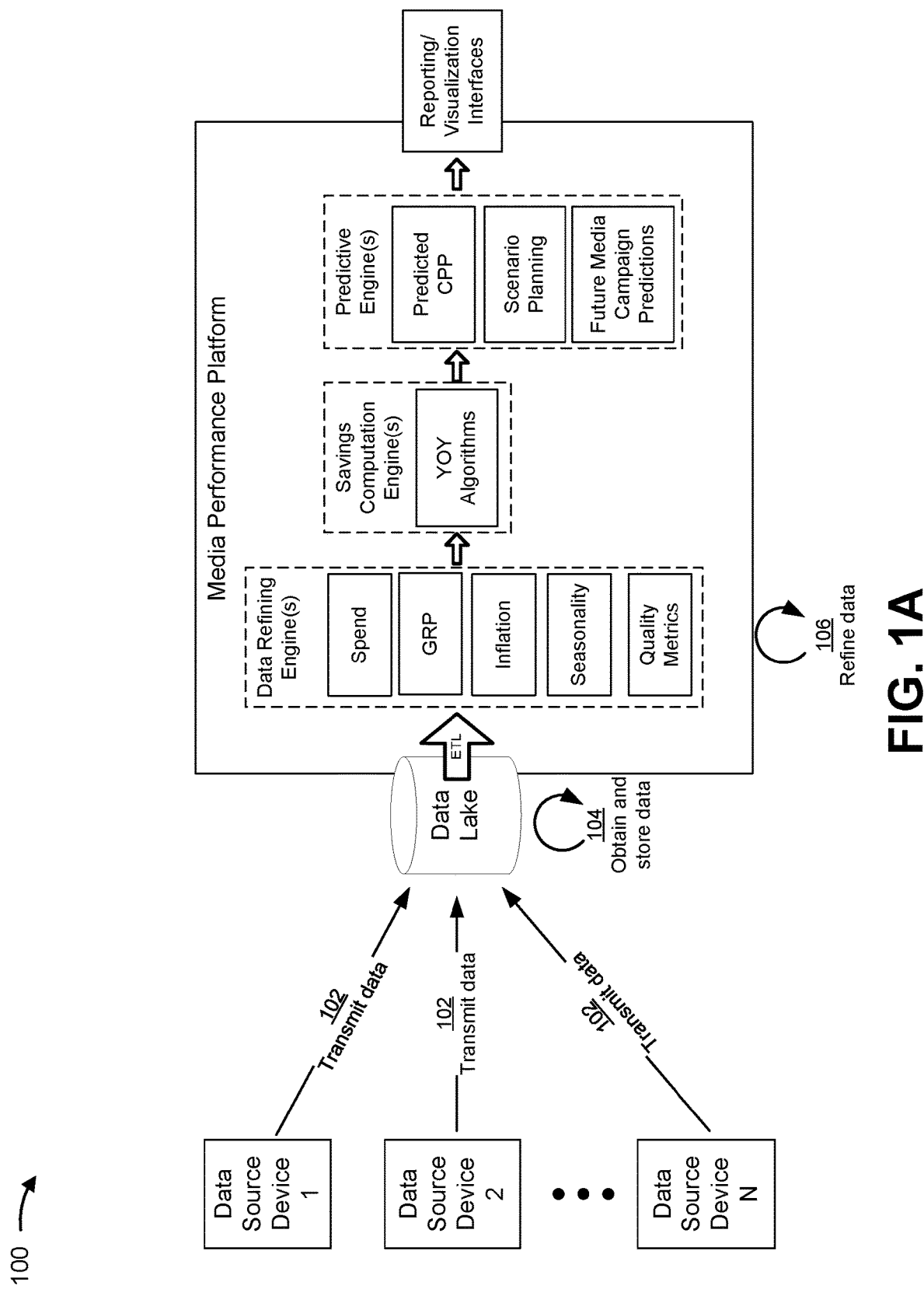
FIGS. 1A-1C are diagrams of an example implementation described herein.
Figure 1B:
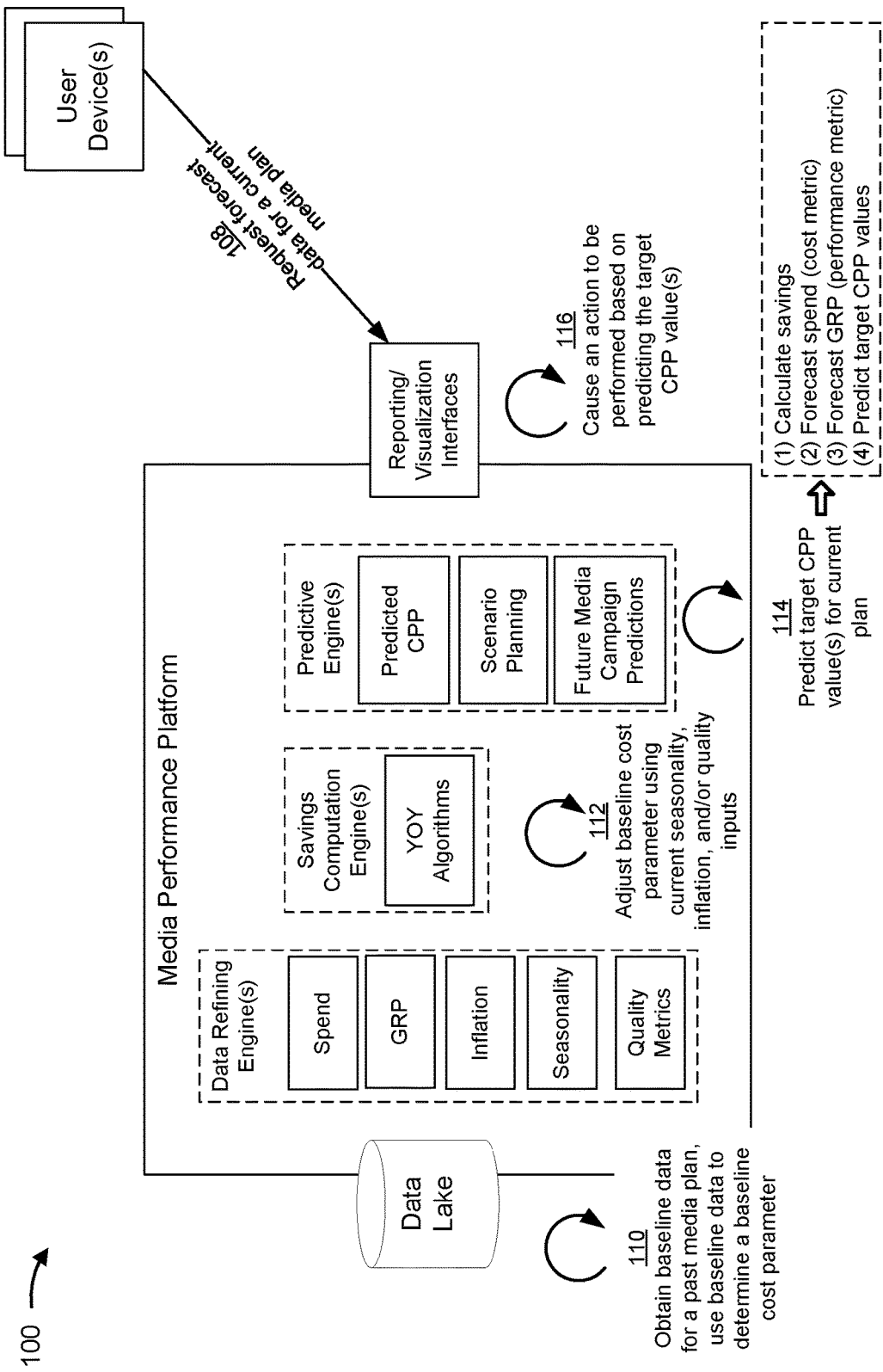
Figure 1C:
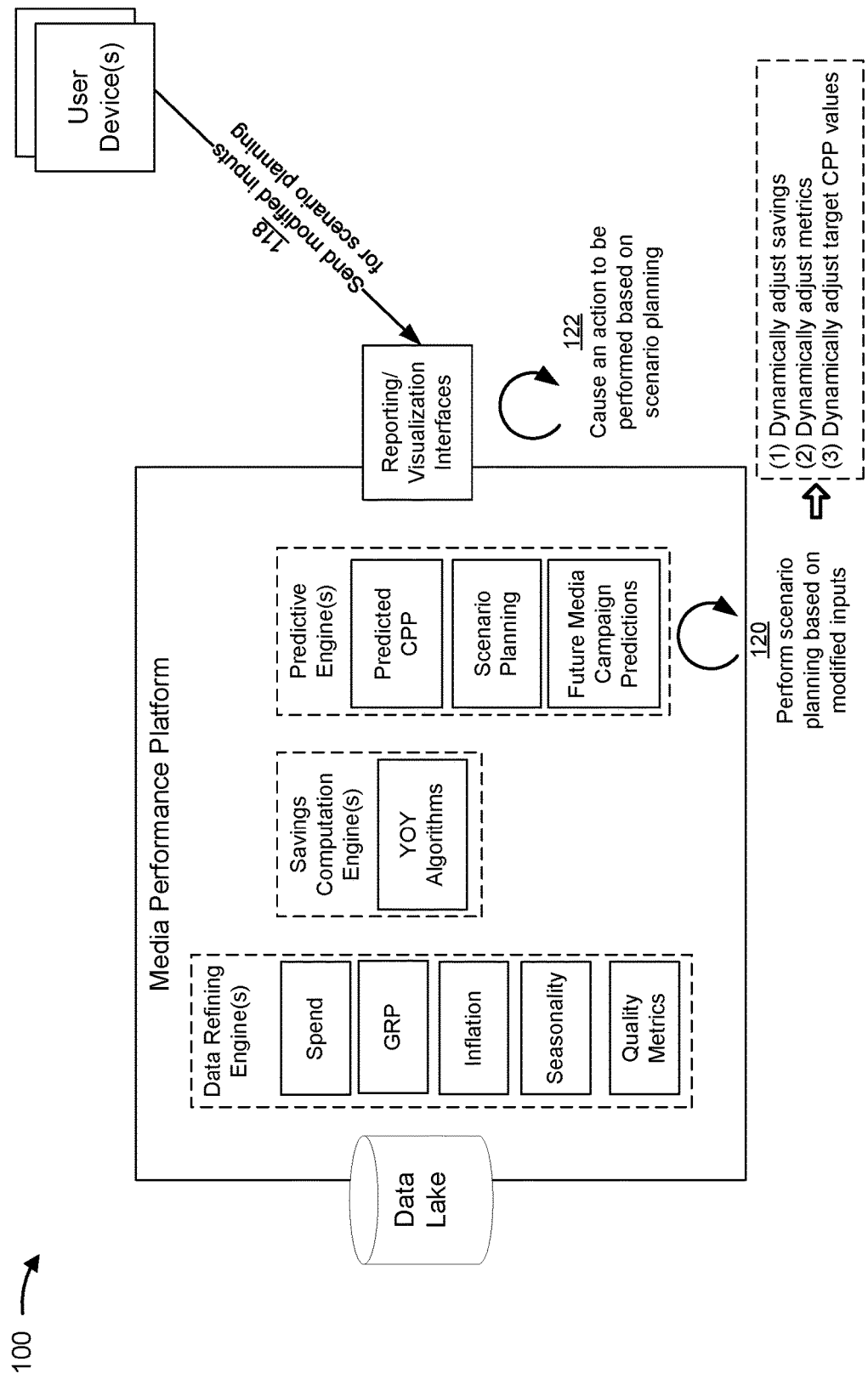

FIGS. 1A-1C are diagrams of an example implementation 100 described herein. As shown in FIGS. 1A-1C, example implementation 100 may include a media performance platform, which interacts with one or more data source devices and one or more user devices. The media performance platform may include one or more data refining engines, by which data received from the data source devices may be extracted, transformed, and/or loaded into one or more usable data structures or formats. The media performance platform may further include one or more savings computation engines, by which year-on-year (YOY) savings may be determined. The media performance platform may further include one or more predictive engines, by which intelligent predictions for target cost per point (CPP) values may be obtained, interactive scenario planning may be facilitated, and/or future media plan predictions may be performed.

As shown in FIG. 1A, and by reference number 102, a plurality of data source devices may send data (e.g., a plurality of data files, data records, and/or the like), to be included in a data lake assessible to the media performance platform. The data source devices may include computers and/or servers associated with one or more data reporting entities (e.g., media agencies, media data tracking entities, data management entities that process, collect, and collate media data, media users/clients, and/or the like). The data received by the data source devices may include media execution data, pricing data, quality data, and/or the like, associated with a plurality of different countries and/or a plurality of different agencies that are executing and/or have executed media plans for a user.

In some implementations, the data source devices may transmit the data files electronically, using an electronic data exchange, the Internet, or any type of electronic data communication protocol. As an example, the data obtained by the media performance platform may include and/or contain data regarding the execution, pricing, and/or quality of a television media plan, data regarding the execution, pricing, and/or quality of a print media plan, data regarding the execution, pricing, and/or quality of an out-of-home media plan, data regarding the execution, pricing, and/or quality of a digital media plan, and/or the like. For example, the data may include cost data, expenditure data, gross rating point (GRP) data, inflation data, audience data (e.g., an audience including males, females, persons in a specific age range, persons in a specific geographic location, housewives, teenagers, and/or the like), prime time data (e.g., media spots that occur during peak viewing times, and/or the like), position break data, coverage data, insertion data, and/or the like. In this way, the media performance platform can receive and analyze millions, billions, trillions, etc., of data files associated with previously executed and currently executing media plans, the volume of which cannot be processed objectively by human actors.

As shown in FIG. 1A, and by reference number 104, the media performance platform may obtain and store the data received from the plurality of data source devices. The data may be populated and stored in a data lake accessible to the media performance platform. The data, in the data lake, may be extracted, transformed (e.g., formatted for use, standardized, or normalized for use, and/or the like, and loaded into one or more usable data structures or formats for use by the media performance platform to predict cost metrics (e.g., forecasted monthly spend, and/or the like), performance metrics (e.g., forecasted GRP, and/or the like, efficiency metrics (i.e., target CPP values, and/or the like), perform scenario planning, and/or the like.

As shown in FIG. 1A, and by reference number 106, the media performance platform may refine the data, obtained from the data lake, by way of one or more data refining engines. For example, in some implementations, the media performance platform may filter and/or categorize the data, and map the filtered and/or categorized data in the data lake to standardized data sets used to determine spend metrics, GRP, inflation factors or indices, seasonality factors or indices, quality metrics (i.e., key performance indicators (KPIs), and/or the like. As another example, the media performance platform may employ automated (e.g., reusable) algorithms and/or functions to filter the data, determine the spend metrics, GRP, inflation factors, seasonality factors or indices, quality metrics, and/or the like, to transform the data in the data lake to a standardized, usable format. The media performance platform may utilize the refined, standardized data, provided by the refining engine, for determining the year-on-year savings, predicting future analytics for a currently executing media plan (i.e., a current media plan), for predicting future analytics for planning a future media plan, and/or for facilitating interactive scenario planning. In this way, the analysis of data may be more automated, efficient, and consistent. Further, the amount of resources (e.g., processing resources, memory resources, and/or the like) required to manually obtain and/or manually refine data received from multiple data source devices may be obviated, or reduced.

Turning now to FIG. 1B, and by reference number 108, the media performance platform may receive a request to forecast (predict) data for a currently executing media plan. In some implementations, the request is received from a user, using a user device, such as a computer (e.g., a desktop computer, a laptop computer, and/or the like), a smart device (e.g., a smart phone, a smart watch, and/or the like), and/or the like. In some implementations, the user may access the media performance platform by way of accessing a web portal, using a user interface of the user device. The request may include, for example, a request to forecast future expenditures (costs) associated with the currently executing media plan, future performance metrics associated with the currently executing media plan, future quality metrics associated with the currently executing media plan, future efficiency metrics associated with the currently executing media plan, and/or the like. In this way, the user may obtain targeted, forecasted media metrics and predictions, and perform one or more actions based on the results of the targeted, forecasted media metrics and predictions. In this way, the user may generate actionable data, and may not be limited to receiving stagnant data provided, for example, by a media agency, in the media agency's progress report.

In some implementations, the request to forecast data for a currently executing media plan may include a request to predict one or more target CPP values for the remainder of the currently executing media plan. The target CPP values include efficiency metrics, by which the user may decide to take one or more actions for the remainder of the currently executing media plan. Such actions may include, for example, altering the media plan based on a result of determining the one or more target CPP values, redefining the media plan based on a result of determining the one or more target CPP values, and/or the like. The target CPP values associated with the currently executing media plan may be predicted for various levels of granularity, or multiple hierarchies (e.g., predicted for a country, a region, a channel, a demographic, and/or the like), which may prompt the user to take one or more actions based on a result of such predictions. For example, where the user may identify a country in a region that is not performing as expected based on the currently executing media plan, the user may decide to reallocate resources, by allocating more or less of a media budget for expenditure in the underperforming country, allocating more or less of the media budget for expenditure on a specific audience (e.g., demographic) in the underperforming country, allocating more or less of a media budget for expenditure on a specific media channel (e.g., print, radio, television, digital, and/or the like) in the underperforming country, and/or the like. In this way, the user may obtain actionable metrics, based on intensive media analytics and media predictions, by which the user may hold a media agency accountable and/or suggest ways in which the media agency may modify execution of the currently executing media plan.

As shown in FIG. 1B, and by reference number 110, the media performance platform may obtain baseline data associated with a past (e.g., baseline, historic, etc.) media plan, and formulate predictions for the currently executing media plan, using the baseline data. In some implementations, the media performance platform may obtain a baseline cost parameter, such as a baseline CPP, which may be determined based on a baseline expenditure and a baseline GRP, to generate predictions for the currently executing media plan. The baseline CPP may be adjusted as set forth herein, using inputs based on the past media plan and/or the currently executing media plan, for use in forecasting media metrics relating to the remainder of the currently executing media plan.

As shown in FIG. 1B, and by reference number 112, the media performance platform may adjust the baseline CPP using one or more cost adjustment factors, including, for example, a cost adjustment factor based on at least one of a seasonality input, an inflation input, or a quality input. In some implementations, the cost adjustment factors may be associated with at least one past media plan, the currently executing media plan, or a combination of the past and current media plans. The cost adjustment factors may be provided in a data structure, such as a database, or a template type of data structure. The baseline data, used to adjust and/or predict media metrics as described herein, may include data associated with a media plan for a same or similar brand as the currently executing media plan, a media plan by a same or a similar media agency as the currently executing media plan, a media plan for a same or similar geographic region as the currently executing plan, and/or the like. In this way, the predictions may be more robust, precise, and/or intelligently determined. In this way, the actions performed based on such predictions may be more tailored to the data, focused, and/or improved.

In some implementations, the baseline CPP may be adjusted by a seasonality input. In some implementations, the seasonality input may include seasonality index values associated with the past media plan, for de-seasonalizing the baseline CPP. The de-seasonalized baseline CPP may be re-seasonalized based on seasonality index values associated with the currently executing media plan. In some implementations, the seasonality index values used to de-seasonalize and/or re-seasonalize the baseline CPP may include deviations from a base number of 1, which may be used to indicate how particular days, months, quarters, and/or the like, of the past and currently executing media seasons compare to an average season. As an example, a cost adjustment factor including a seasonal index value of 1.3 (or 130%), would indicate that that a day, month, quarter, and/or the like, of a season is increased by 30% more than the seasonal average. Seasonality index values may fluctuate based on, for example, world events (e.g., index values may increase based on media coverage provided during an election year, months leading up to a royal wedding, and/or the like), sporting events (e.g., index values may increase or decrease based on whether or not a particular year includes the winter/summer Olympics, World Cup, and/or the like), holidays (e.g., index values may increase based on holiday expenditures, and/or the like), and/or the like.

In some implementations, the baseline CPP may be adjusted by a cost adjustment factor based on a quality input. In some implementations, the quality input includes an input obtained for and/or associated with the currently executing media plan. For example, the quality input may include one or more deviation values based on comparing targeted KPI values to delivered KPI values, for the currently executing media plan. Example KPI values include, for example, values associated with an amount of prime time for an advertisement, values associated with a position break (e.g., where the advertisement appears during a football game, and/or the like) of an advertisement, values associated with an amount of coverage for an advertisement, and/or the like. As an example, the cost adjustment may include an adjustment factor index based on the deviation between a targeted amount of prime time spots and a delivered amount of prime time spots. As prime time spots may be more expensive than non-prime time spots, the baseline CPP may be adjusted down. For example, where a media plan targeted 5 prime time spots, but only delivered 2 primetime spots, the cost adjustment factor may include a product of 2 deviations and the adjustment factor index. The cost adjustment factor may be based on a single KPI, or multiple KPIs (e.g., a product of multiple quality adjustments), where desired.

In some implementations, the baseline CPP may be adjusted by a cost adjustment factor based on an inflation input. In some implementations, the inflation input may be based on an amount of monetary inflation and/or an amount of monetary absorption between execution of the past media plan and the currently executing media plan, for a country. In some implementations, the baseline CPP may be adjusted based on one of the seasonality input, the inflation input, or the quality input. In some implementations, the baseline CPP may be adjusted based on a combination of any two or more of the seasonality input, the inflation input, or the quality input.

As shown in FIG. 1B, and by reference number 114, the media performance platform may predict target CPP values for the currently executing media, based on the adjusted predictive baseline cost parameter, such as the adjusted baseline CPP. In predicting the target CPP values for the currently executing media plan, the media performance platform may determine one or more of an amount of savings, one or more forecasted cost metrics (e.g., forecasted monthly spend, and/or the like), and one or more forecasted performance metrics (e.g., forecasted GRP, and/or the like). In some implementations, the predicted CPP values indicate the cost target, for each GRP, needed to achieve year-end metrics for the currently executing media plan. The user may be caused to steer the plan in a different direction (e.g., alter a target audience, country, channel, budget, and/or the like), based on obtaining the target CPP values. In this way, the user may course correct a media plan mid-execution, to ensure that media plan metrics are met, and manage agency remuneration.

In some implementations, the media performance platform may determine an amount of savings, such as an amount of year-on-year savings, based on comparing data associated with the past media plan and data associated with the currently executing media plan. The forecasted metrics may be refined based on incorporating the amount of savings determined by the media performance platform, for use in obtaining more accurate, and improved, predictions. In some implementations, the amount of savings may be determined based on determining an equivalent spend, or money that a media agency should have spent to achieve the GRP ratings delivered for the currently executing media plan. The equivalent spend may be determined as a product of the baseline CPP, as adjusted based on a quality input, and the GRP delivered for the currently executing media plan. The savings may be determined as the difference between the equivalent spend, and the actual amount of budget spent for the currently executing media plan. The savings may be output based on an audience, channel, and/or month level, and may be used to adjust one or more cost metrics when predicting the target CPP values, as set forth herein.

In some implementations, the media performance platform may predict one or more cost metrics (e.g., a forecasted monthly spend, a forecasted equivalent spend, and/or the like), associated with the remainder of the currently executing media plan. In this way, the user may predict how the media budget may be allocated based on the currently executing media plan. In some implementations, the monthly forecasted spend may be determined based on determining an amount of unutilized budget associated with the currently executing media plan, and weighing proportionate (e.g., monthly) amounts of the unutilized budget by the baseline CPP, which may be adjusted based on a seasonality input. The monthly forecasted spend may be adjusted (e.g., increased, decreased, and/or the like) based on determining the amount of savings, for example, as determined by the equivalent spend.

In some implementations, one or more performance metrics may be forecasted for predicting the target CPP values associated with the currently executing media plan. For example, in some implementations, the target CPP values may be determined based on dividing one or more cost metrics by one or more performance metrics. In some implementations, the media performance platform may predict a GRP associated with the future of the currently executing media plan, by which the user may predict the percentage of a target audience to be reached by media marketing and/or advertising efforts set forth in the currently executing media plan. In some implementations, the GRP may be predicted based on dividing the forecasted equivalent spend, by the baseline CPP, as adjusted by the quality input. The target CPP values may be predicted, for example, by month, based on dividing the monthly forecasted spend by the monthly predicted GRP. In some implementations, the target CPP values may be determined for a specific audience targeted by the currently executing media plan, a specific channel specified in the currently executing media plan, a specific geographic area specified in the currently executing media plan, a specific media agency executing the currently executing media plan and/or the like. In this way, the media performance platform provides a user with an ability to compare target CPP values for different countries, channels, audiences, media plans, and/or the like.

In some implementations, and, as an option, the media performance platform may optionally utilize a model to predict the target CPP values for the currently executing media plan, based on a past media plan. For example, data, from the past media campaign may be used to train a model to predict target CPP values based on past expenditures, past GRPs, past KPIs, and/or the like, to predict, using the model, target CPP values for the currently executing media campaign based on modeling behavior from the past media plan. In this way, predicting target CPP values may be more robust and/or intelligent.

in a sentence or two (and at the appropriate location in this description), you should also mention (if we don't mention it below) that we can model campaign behavior based on past media plan behavior. once we have modeled behavior then we can feed in data from our current media plan into our model to predict how this current media plan will behave in the future.

As shown in FIG. 1B, and by reference number 116, the media performance platform may cause one or more actions to be performed based on predicting the target CPP values for the currently executing media plan. In some implementations, the media performance platform may cause the results to be visually displayed to the user, reported (e.g., visually, printed, and/or the like) to the user, downloaded by the user, and/or the like. In some implementations, the media performance platform may cause modification of the currently executing media plan, redefining the currently executing media plan, opting-out of the currently executing media plan, reallocating budget for the currently executing media plan, performing scenario planning for the currently executing media plan, and/or the like, based on determining the target CPP values. In this way, the media performance platform may cause more intelligent decisions to be made regarding the future of the currently executing media plan, based on the results of predicting the target CPP values for the currently executing media plan. Additional actions may include, for example, causing a device to create an alternative media advertisement, causing a device to deliver an alternative media advertisement to particular user devices in a particular time period, or when the user devices are within a geographic area, and/or the like. For example, predicting the target CPP values may cause a device to create an alternative media plan, including an alternative media advertisement, and transmit the alternative media advertisement to a different audience, or using a different channel. In this way, a currently executing media plan may be modified, mid-execution, to chance one or more media plan attributes (e.g., audience, channel, country, budget, etc.).

Turning now to FIG. 1C, and by reference number 118, a user device may interact with the media performance platform, by sending modified inputs to be used for scenario planning. In some implementations, a user may access a user interface, by which the user may modify inputs, used by the media performance platform, for performing scenario planning. In some implementations, the user may adjust one or more quality inputs, budget allocation inputs, and/or the like, to perform scenario planning by way of dynamically predicting alternative metrics for the currently executing media plan. In this way, the user may gain intelligent insight into alternative scenarios that may be achievable for the future of the currently executing media plan, by which the user may elect to change a course in which the currently executing media plan is headed, and pursue one of the alternative scenarios.

As shown in FIG. 1C, and by reference number 120, the media performance platform may implement scenario planning based on receiving the request to modify inputs from the user device. During scenario planning, the user may modify one or more quality inputs (e.g., one or more KPIs), budget inputs, and/or the like, by which the media performance platform may dynamically adjust the amount of year-on-year savings, the predicted metrics (e.g., monthly forecasted spend, monthly equivalent spend, forecasted GRP, and/or the like), and, in turn, dynamically output new target CPP values for the currently executing media plan. In this way, the media performance platform may enable the user to visualize what savings may be achieved, should the media plan target different KPIs and/or combinations of KPIs. In this way, scenario planning, provided by way of the media performance platform, may additionally be used as the foundation for developing and planning future media plans.

As an example, the user may modify an amount of prime time spots for the currently executing media plan. For example, the user may modify, as input to the media performance platform, an amount of prime time spots from 5 spots to 10 spots for the remainder of the currently executing media plan. The media performance platform may dynamically, and in real-time, adjust the amount of savings based on the modification, dynamically adjust the cost and performance metrics based on the amount of savings, and dynamically adjust the target CPP values for the currently executing media plan. The media performance platform may, using the predictive engine, perform dynamic calculations to adjust the savings calculations and media plan forecasting, on-the-fly, at immediate speeds. In some implementations, the scenario planning may be provided by way of implementing a software plug-in, whereby the scenario planning option may be turned on and/or off by the user.

As another example, the user may input a modified amount of unutilized budget for a currently executing media plan. For example, the user may increase or decrease the budget for the remainder of the currently executing media plan. The media performance platform may dynamically, and in real-time, adjust the amount of savings based on the budget modification, dynamically adjust the cost and performance metrics based on the amount of savings, and dynamically adjust the target CPP values for the currently executing media plan, based on the modified input.

As shown in FIG. 1C, and by reference number 122, the media performance platform may cause one or more actions to be performed based on a result of the scenario planning. Example actions may include, for example, reallocating a budget based on the scenario planning, modifying quality metrics based on the scenario planning, redefining the currently executing media plan based on the scenario planning, visually depicting, in real-time, dynamic changes to the predicted metrics for the currently executing media plan, generating live, on-the-fly reports based on the dynamic changes to the currently executing media plan, and/or the like.

In some implementations, the media performance platform is configured to provide live updates to the currently executing media plan during scenario planning, by which the updates may be visually depicted and/or otherwise reported, using two or more different methodologies. For example, in some implementations, the media performance platform may execute paired calculations running across multiple KPIs, for capturing all possible combinations for various countries, on-the-fly. A first calculation, of the pair of calculations, may be performed, for example, using JAVA script, for generating comparable reports based on the live updates and user input, whereas another pair of calculations may be performed by way of custom scripting, to provide for and/or implement data visualization. The media performance platform is configured to deliver fast, efficient, and/or flawless performance associated with generating live reports, live graphics, and/or dynamically updated metrics, based on the user input during scenario planning. In this way, the media performance platform may provide a flexible, scalable, and intelligent approach to predicting media metrics for currently executing media plans. By standardizing determination of media metrics based on the millions, billions, or more data records received from the data source devices, in addition to providing live updates to the predictions based on the user input during the interactive scenario planning, computing resources that would otherwise be needed to aggregate, refine, and/or consolidate data from a plurality of disparate data sources and, additionally, determine media metrics based on the plurality of disparate data sources may be conserved.

In this way, several different stages of the process for media data extraction, transformation, loading, and/or prediction of media metrics may be automated, which may remove human subjectivity and waste from the process, and which may improve speed and efficiency of the process, and which may conserve computing resources (e.g., processor resources, memory resources, and/or the like) that would otherwise be required for manually processing the data. Furthermore, implementations described herein employ a rigorous, computerized process to perform tasks or roles that were not previously performed, or were previously performed using subjective human intuition or input. For example, currently there does not exist a technique to automate media data extraction, transformation, loading, and/or forecasting of media metrics, mid-execution, of a currently executing media plan, based on data obtained for a baseline media plan and/or the currently executing media plan. In this way, the media performance platform provides a robust and flexible predictive engine, configured to integrate cost and quality KPI metrics for previously executed media plans, and apply such metrics to the unutilized (remaining) budget for the currently executing media plan, thus, forecasting target CPP values at multiple hierarchy levels (e.g., country, channel, and/or the like), and providing intelligent, actionable insights.

As indicated above, FIGS. 1A-1C are provided merely as an example. Other examples are possible and may differ from what was described with regard to FIGS. 1A-1C.

Figure 2A:
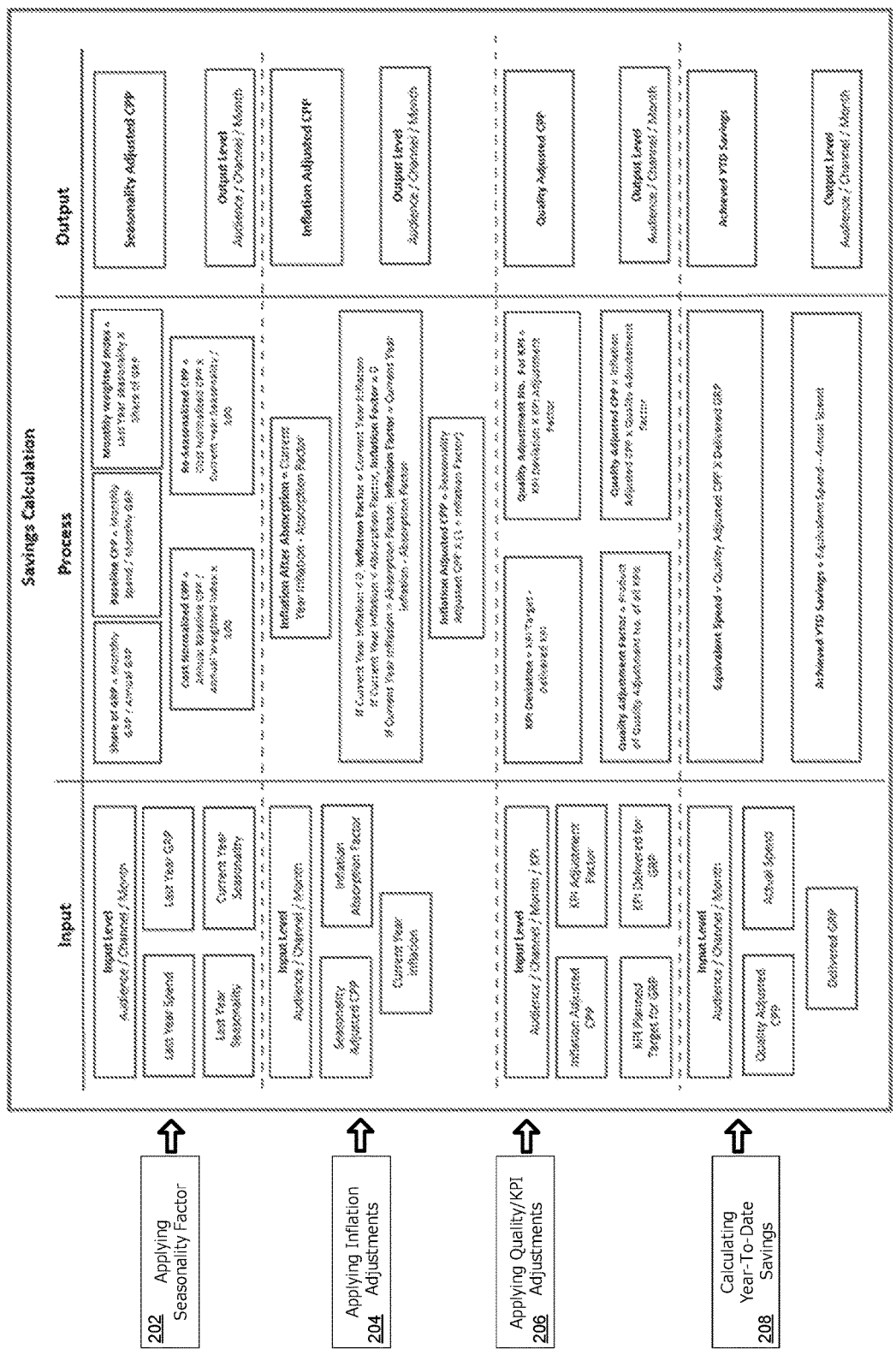
FIGS. 2A-2C are diagrams of an example implementation described herein.
Figure 2B:
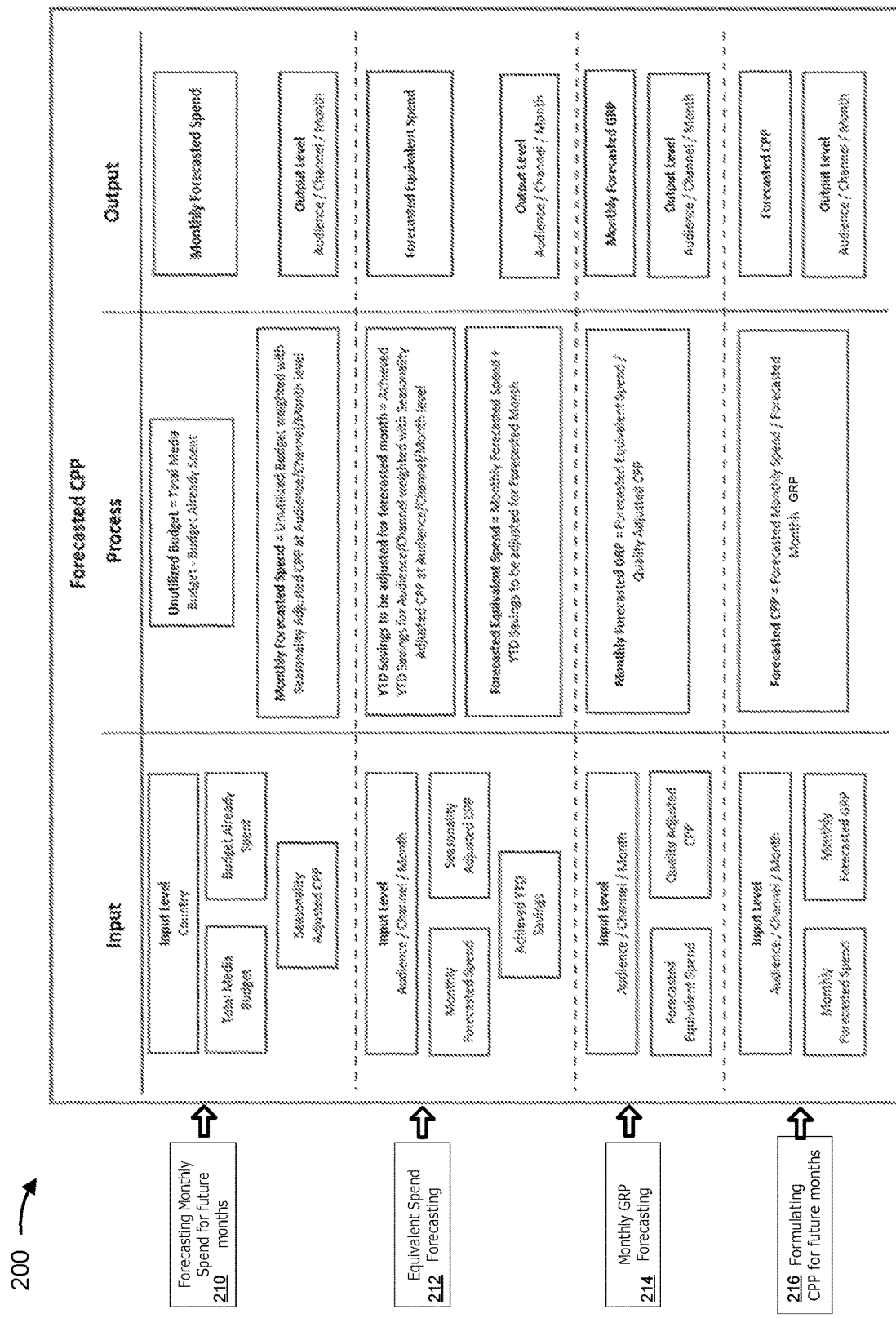
Figure 2C:
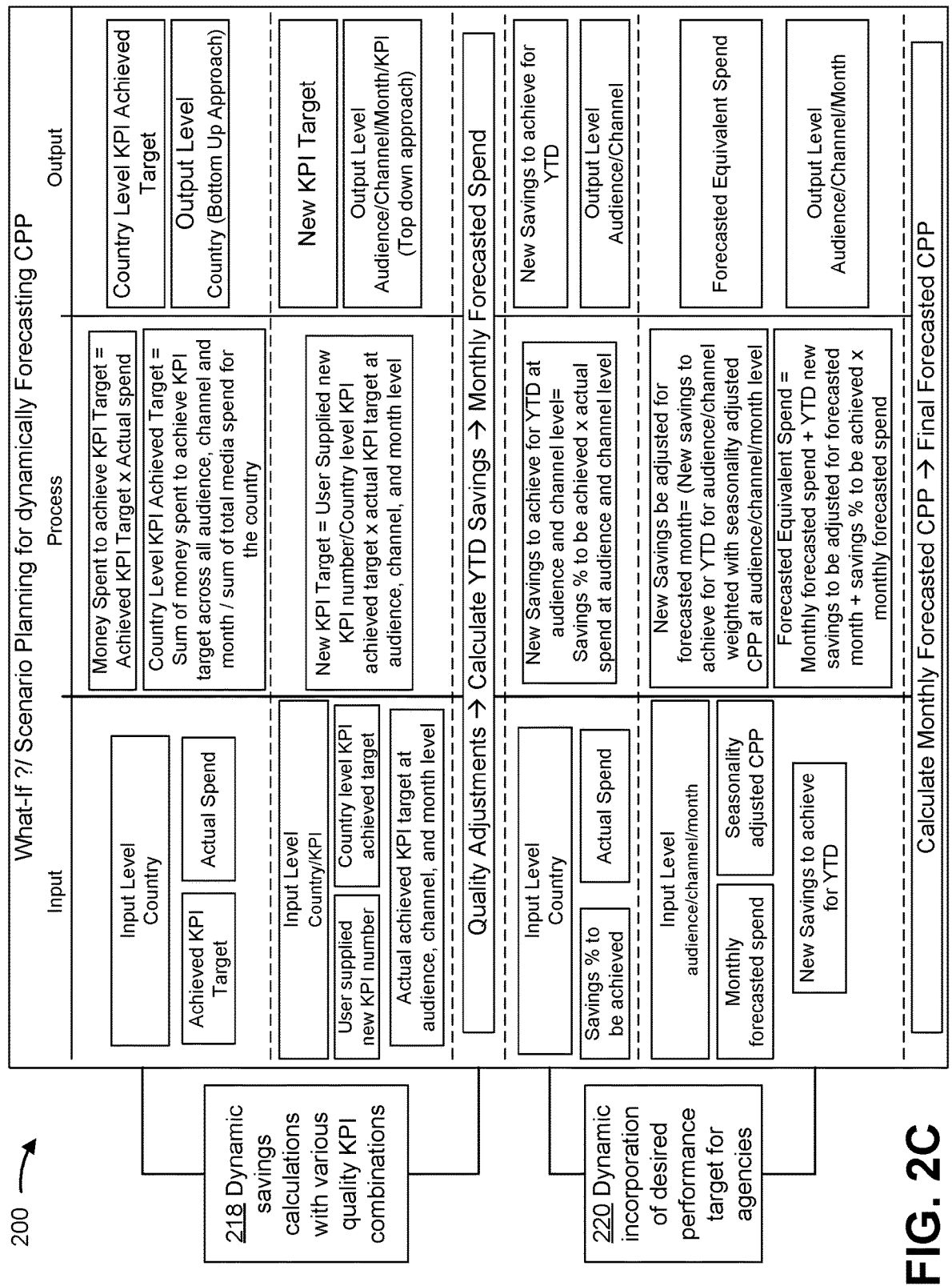

FIGS. 2A-2C are diagrams of a further example implementation 200 described herein. Example implementation 200 depicts the one or more inputs, processes, and/or outputs utilized by the media performance platform for determining an amount of year-on-year savings (FIG. 2A), forecasting target CPP values for a remainder of a currently executing media plan (FIG. 2B), and performing scenario planning (FIG. 2C) based on a user dynamically interacting with the media performance platform, to modify one or more inputs, by way of the media performance platform.

As shown in FIG. 2A, and by reference number 202, inputs, including one or more baseline parameters (e.g., last year spend, last year GRP, last year seasonality, and/or the like), may be obtained for determining, as output, a predictive baseline cost parameter (e.g., a seasonality adjusted CPP). The predictive baseline cost parameter may be determined based on de-seasonalizing the baseline CPP, to remove seasonality indices for the previous year, and re-seasonalizing the baseline CPP, based on seasonality indices for the current year. In some implementations, the seasonality adjustments may be based on a seasonality index obtained for the past year and/or the current year, which may be based on the timing and/or events that may affect the media plan, such as holidays, world events, regional events, catastrophic events, and/or the like.

In some implementations, the media performance platform may determine a share of GRP based on an equation, such as:

$$GRP = \frac{\text{Monthly } GRP}{\text{Annual } GRP}$$

Similarly, the media performance platform may determine a baseline CPP based on an equation, such as:

$$\text{Baseline } CPP = \frac{\text{Monthly Spend}}{\text{Monthly } GRP}$$

Similarly, the media performance platform may determine a monthly weighted index based on an equation, such as:

$$\text{Monthly weighted Index} = \frac{\text{Last Year Seasonality}}{\text{Share of } GRP}$$

Similarly, the media performance platform may determine a cost normalized CPP based on an equation, such as:

$$\text{Cost Normalized } CPP = \left[\frac{\text{Annual Baseline } CPP}{\text{Annual Weighted Index}}\right] \times 100$$

Similarly, the media performance platform may determine a re-seasonalized CPP based on an equation, such as:

Re-Seasonalized CPP=[Cost Normalized CPP×Current Year Seasonality]/100

In this way, the past media plan data (i.e., baseline data) may be de-seasonalized (e.g., to remove the past year seasonality) and re-seasonalized (e.g., to include the current year seasonality).

As shown in FIG. 2A, and by reference number 204, inputs, including the seasonality adjusted predictive baseline cost parameter, may be adjusted based on an inflation input (e.g., inflation absorption factor, current year inflation, and/or the like). The seasonality adjusted predictive baseline cost parameter may be adjusted based on applying an inflation factor, according to the process indicated by reference number 204. The media performance platform may generate, and output, a seasonality and inflation adjusted predictive baseline cost parameter (e.g., a seasonality and inflation adjusted CPP), for use in predicting an amount of year-on-year savings, predicting target CPP values for the currently executing media plan, and/or the like.

For example, the media performance platform may determine an inflation after absorption based on an equation, such as:

Inflation after absorption=Current Year Inflation−Absorption Factor

Similarly, the media performance platform may determine an inflation adjusted CPP based on an equation, such as:

Inflation Adjusted CPP=Seasonality Adjusted CPP×(1+Inflation Factor)

Regarding the inflation factor, in some implementations, where the current year inflation is <0, the current year inflation factor equals the current year inflation. In some implementations, where the current year inflation is less than the absorption factor, the inflation factor equals 0. In some implementations, where the current year inflation is greater than the absorption factor, the inflation actor equals the current year inflation minus the absorption factor.

As shown in FIG. 2A, and by reference number 206, inputs, including the seasonality and/or inflation adjusted predictive baseline cost parameter, may be adjusted based on a quality input. Such quality input may be based on a deviation between one or more targeted KPIs and the delivered KPIs, for the currently executing media plan. In this way, the predictive baseline cost parameter may adjust up or down, based on KPIs delivered for the currently executing media plan, which improves the accuracy associated with metrics predicted based on the predictive baseline cost parameter.

For example, the media performance platform may determine a KPI deviation based on an equation, such as:

KPI Deviation=KPI Target−Delivered KPI

Similarly, the media performance platform may determine a quality adjustment number for a KPI based on an equation, such as:

Quality Adjustment No. for KPI=KPI Deviation×KPI Adjustment Factor

In some implementations, the KPI adjustment factor may be provided in a template or data structure based on a baseline media plan and/or the current media plan. Similarly, the media performance platform may determine a quality adjustment factor based on an equation, such as:

Quality Adjustment Factor=Product of Quality Adjustment No. of all KPIs

Similarly, the media performance platform may determine a quality adjusted CPP based on an equation, such as:

Quality Adjusted CPP=Inflation Adjusted CPP×Quality Adjustment Factor

As shown in FIG. 2A, and by reference number 208, the media performance platform may determine the year-to-date (e.g., year-on-year) savings based on the quality adjusted CPP, delivered GRP, and actual expenditure. Such savings may be used, for example, to adjust the predicted cost and/or performance metrics based on past media plan inflation, seasonality, and/or quality adjustments.

For example, the media performance platform may determine an equivalent spend based on an equation, such as:

Equivalent Spend=Quality Adjusted CPP×Delivered GRP

Similarly, the media performance platform may determine an achieved year to date savings (e.g., a YOY savings), based on an equation, such as:

Achieved YTD Savings=Equivalent Spend−Actual Spend

Turning now to FIG. 2B, the media performance platform may predict, or forecast, target CPP values for the remainder of the currently executing media plan. As shown by FIG. 2A, and reference number 210, the media performance platform may predict or forecast a first cost metric, such as a forecasted monthly spend, for future months of the currently executing media plan. The forecasted monthly spend may be determined by weighing the unutilized budget for the currently executing media plan (e.g., allocated based on the remaining duration of the media plan), by the seasonality adjusted CPP.

For example, the media performance platform may determine an unutilized budget (i.e., for a currently executing media plan) based on an equation, such as:

Unutilized Budget=Total Media Budget−Budget Already Spent

Similarly, the media performance platform may determine a monthly forecasted spend, based on an equation, such as:

Monthly Forecasted Spend=Unutilized budget weighted with seasonality adjusted CPP (e.g., at audience, channel, month level)

As shown in FIG. 2B, and by reference number 212, the media performance platform may determine an equivalent spend based on adjusting the monthly forecasted spend (i.e., determined at 210), by the year-to-date savings (i.e., determined at 208). In this way, data associated with the past media plan may be used to refine the data used to predict the target CPP values for the currently executing media plan.

For example, the media performance platform may determine a YTD savings to be adjusted for forecasted month based on an equation, such as:

YTD Savings to be adjusted for forecasted month=Achieved YTD Savings (e.g., for audience, channel, etc.) weighted with Seasonality Adjusted CPP (e.g., for audience, channel, month level etc.)

Similarly, the media performance platform may determine a forecasted equivalent spend, based on an equation, such as:

Forecasted Equivalent Spend=Monthly Forecasted Spend+YTD Savings to be adjusted for forecasted month As shown in FIG. 2B, and by reference number 214, the media performance platform may predict monthly GRP for the currently executing media plan. In some implementations, the monthly GRP may be predicted based on dividing the forecasted equivalent spend (e.g., determined at 212), by the quality adjusted CPP. In this way, the media performance platform may determine a percentage of a target audience expected to be reached by media marketing and/or advertising efforts set forth in the currently executing media plan.

For example, the media performance platform may determine a monthly forecasted GRP, based on an equation, such as:

$$\text{Monthly Forecasted } GRP = \frac{\text{Forecasted Equivalent Spend}}{\text{Quality Adjusted } CPP}$$

As shown in FIG. 2B, and by reference number 216, the media performance platform may predict target CPP values for a remainder (e.g., future months) of the currently executing media plan. For example, the media performance platform may predict the target CPP values based on dividing the forecasted monthly spend (i.e., determined at 210), by the forecasted monthly GRP (i.e., determined at 214). In this way, a user may determine the costs for targeting GRP to achieve year end metrics. The media performance platform may generate and send notifications, to the user, for instances where the target CPP values may deviate from the currently executing media plan. Moreover, the user may course correct the currently executing media plan, based on the target CPP values predicted by the predictive engine.

For example, the media performance platform may determine a forecasted (target) CPP, based on an equation, such as:

$$\text{Forecasted } CPP = \frac{\text{Forecasted Monthly Spend}}{\text{Forecasted Monthly } GRP}$$

Turning now to FIG. 2C, the media performance platform may facilitate scenario planning, for determining alternative metrics that may be achievable according to altering inputs (e.g., KPIs, budget inputs, and/or the like) associated with the currently executing media plan. As shown by reference number 218, the media performance platform may dynamically update savings calculations, cost metrics, performance metrics, and/or the target CPP values based on a user input that modifies one or more KPIs. For example, a user may, using a user interface, modify or adjust one or more KPI values, for example, to modify the KPIs for a currently executing media plan. The media performance platform may, in real-time, dynamically adjust the savings, cost, and performance metrics based on the modified KPIs so that the user may determine what savings may be achieved, what performance metrics may be achieved, and/or the like, based on the modifications. In this way, the user may intelligently plan future media plans, adjust a currently executing media plan, and/or the like.

For example, the media performance platform may determine an amount of money spent to achieve a KPI target based on an equation, such as:

Money Spent to Achieve KPI Target=Achieved KPI Target×Actual Spend

Similarly, the media performance platform may determine a country level KPI Achieved Target, based on an equation, such as:

$$\text{Country level } KPI \text{ Achieved Target} = \frac{\begin{array}{c}\text{Sum of money spent to achieve } KPI \\ \text{target across all audience, channel, month}\end{array}}{\text{Sum of total media spend for the country}}$$

Similarly, the media performance platform may dynamically determine a new KPI target, based on an equation inputting the user supplied (e.g., interactive KPI number), such as:

$$\text{New } KPI \text{ Target} = \frac{\text{User Supplied New } KPI \text{ Number}}{\text{Country Level } KPI \times \text{Actual } KPI \text{ Target}}$$
(at audience, channel, month level)

As shown in FIG. 2C, and by reference number 220, the media performance platform may facilitate scenario planning, for determining alternative metrics that may be achievable according to altering the savings inputs associated with the currently executing media plan. For example, a user may, using a user interface, modify or adjust a desired savings value, for example, to modify the amount of savings associated with executing the currently executing media plan. The media performance platform may, in real-time, dynamically adjust the cost metrics, performance metrics, and/or target CPP values based on the modified savings so that the user may determine what cost metrics, performance metrics, and/or efficiency metrics may be achieved based on the modifications. In this way, the user may intelligently adjust a currently executing media plan, to achieve more savings, as desired.

For example, the media performance platform may determine a new savings to achieve for YTD at audience and channel level based on an equation, such as:

New Savings to Achieve for YTD at Audience and Channel Level=Savings % to be achieved×Actual Spend at Audience and Channel Level Similarly, the media performance platform may determine a new savings to be adjusted for a forecasted month, based on an equation, such as:

New Savings to be adjusted for forecasted month=New Savings of achieve for YTD for audience, channel, weighted with seasonality adjusted CPP at audience, channel, month level;

Similarly, the media performance platform may determine a forecasted equivalent spend, based on an equation, such as:

Forecasted Equivalent Spend=Monthly forecasted spend+YTD New Savings to be adjusted for forecasted month+Savings % to be achieved× Monthly forecasted spend As indicated above, FIGS. 2A-2C are provided merely as an example. Other examples are possible and may differ from what was described with regard to FIGS. 2A-2C.

Figure 3:
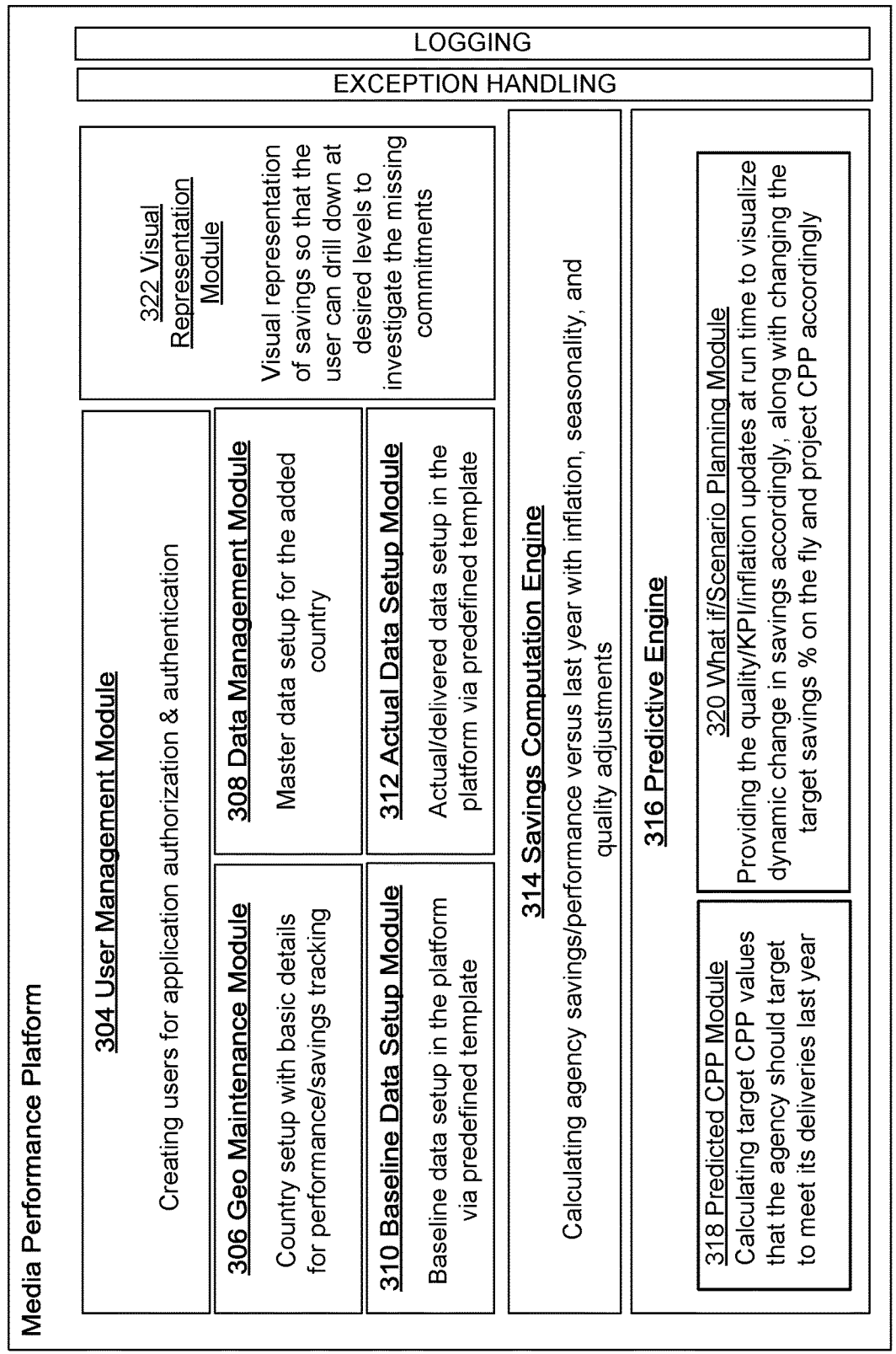
FIG. 3 is a diagram of example modules and/or engines included in one or more devices described herein.

FIG. 3 is a diagram of example modules and/or engines that may be included in one or more devices 300 described herein. Device 300 may correspond to the media performance platform described herein. In some implementations, the media performance platform may include one or more devices 300 and/or one or more components of device 300. As shown in FIG. 3, device 300 may include a user management module 304, a geographical (Geo) maintenance module 306, a data management module 308, a baseline data setup module 310, an actual data setup module 312, a savings computation engine 314, a predictive engine 316, and/or a visual representation module 322, exception handling, and/or logging abilities. In some implementations, the predictive engine 316 may include a predicted CPP module 318, and a scenario planning module 320.

In some implementations, the modules and/or engines of device 300 may perform one or more processes based on a processor (e.g., 520, FIG. 5) executing software instructions stored by a non-transitory computer-readable medium. A computer-readable medium refers to a non-transitory memory device, such as, for example, a memory device including memory space within a single physical storage device or memory space spread across multiple physical storage devices.

The user management module 304 may perform authorization and/or authentication procedures for users attempting to access the media performance platform. In some implementations, the user management module may manage user profiles associated with users having access to the media performance platform. Authorization to the media performance platform may be denied and/or granted upon presentation of login credentials. For example, user management module 304 may grant a user access to the media performance platform, or deny the user access to the media performance platform, based on the login credentials.

Geographical maintenance module 306 may perform one or more aspects relating to setting up savings and/or media performance tracking based on a given country (e.g., United Kingdom, Germany, France, and/or the like). In this way, local media adjustments and/or variations associated with a given country may be accounted for when making predictions and/or performing scenario planning. For example, the geographical maintenance module 306 may include one or more adjustment factor indices to be used in connection with the quality-based cost adjustment factors for a given country, specific factors for use in determining various metrics for a country, and/or the like. In this way, variations in local KPIs, local savings adjustments, local channelized deliveries, and/or the like may be standardized for use in determining the savings, cost metrics, and/or performance metrics for different countries. In this way, the country-to-country comparison of media metrics for different countries may be more meaningful, and accurate.

Data management module 308 may perform one or more aspects relating to providing up master data for a given country. For example, the data management module 308 may be configured to manage and/or track media data obtained for a given country, by which savings, cost metrics, performance metrics, and/or target CPP values may be determined.

Baseline data setup module 310 may be configured to provide baseline data associated with one or more past media plans. In some implementations, the past media plan data may be provided, to the media performance platform, in one or more predefined templates using the baseline data setup module. Such baseline data may include, for example, baseline expenditures, baseline CPP values, baseline GRP values, and/or the like.

Actual data setup module 312 may be configured to provide actual data, associated with a currently executed media plan. In some implementations, the current (actual) media plan data may be provided, to the media performance platform, in a predefined template using the actual data setup module. Such actual data may include, for example, actual expenditures, actual GRP values, and/or the like.

Savings computation engine 314 may be configured to calculate an amount of year-on-year savings achieved between a baseline media plan and a currently executed media plan. The amount of savings may be adjusted based on seasonality, inflation, and/or quality, as set forth herein, for improving the accuracy of predictions and/or interactive scenario planning that include the amount of savings.

Predictive engine 316 may be configured to input data received by baseline data setup module 310 and actual data setup module 312, to calculate target CPP values and/or perform scenario planning for a currently executing media plan. The predictive engine 316 may include, for example, the predicted CPP module 318 and the scenario planning module 320.

In some implementations, the predicted CPP module 318 may predict the target CPP values that a media agency should target to meet the quality deliveries or KPIs, based on a previous media plan. In some implementations, the scenario planning module 320 may provide dynamic savings calculations, dynamic cost metrics calculations, dynamic performance metric calculations, and/or target CPP value calculations, based on modified user input. In this way, the media performance platform may provide an interactive tool, by which a user may manipulate input values to obtain a desired end-result. The user may modify, redefine, and/or reallocate budget based on results of the target CPP value predictions and/or the scenario planning.

Visual representation module 322 may be configured to visually depict and/or display the amount of savings, predicted metrics, and/or the like, so that the user may drill down to desired levels of the media plan for investigating underperforming countries, channels, and/or the like. The visual representation module may be operable based on a different programming languages and/or customized scripting compared to any of the other modules. In this way, the media performance platform may be configured to perform multiple sets of calculations for determining savings, cost metrics, performances metrics, and/or target CPP values, by which the data may be presented to the user according to different methodologies and/or formats (e.g., visual reports, text reports, and/or the like). In this way, the media performance platform provides a flexible and robust design, by which media metrics may be predicted and/or presented according to different methodologies.

As indicated above, FIG. 3 is provided merely as an example. Other examples are possible and may differ from what was described with regard to FIG. 3.

Figure 4:
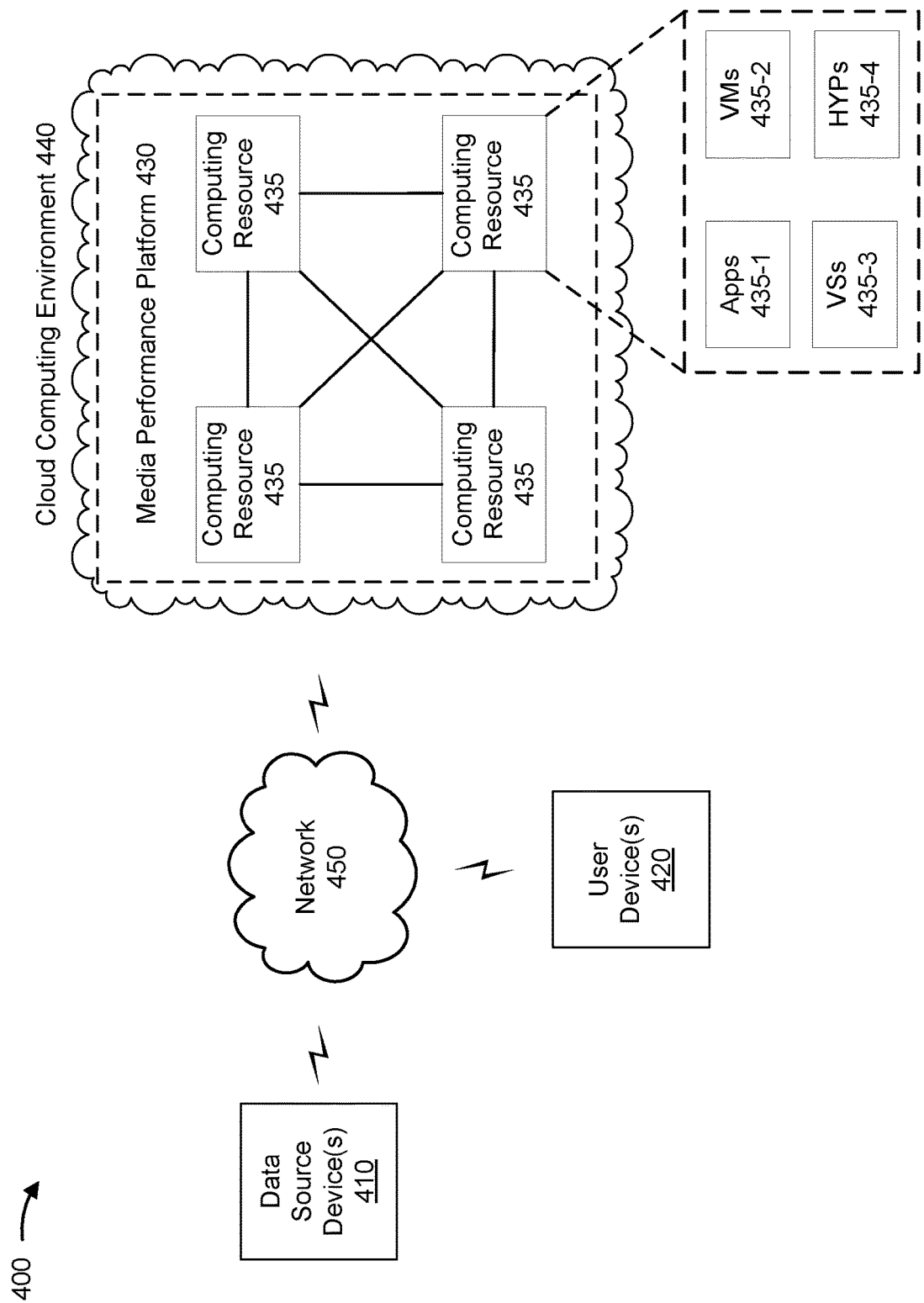
FIG. 4 is a diagram of an example environment in which systems and/or methods, described herein, may be implemented.

FIG. 4 is a diagram of an example environment 400 in which systems and/or methods, described herein, may be implemented. As shown in FIG. 4, environment 400 may include a data source device 410, a user device 420, a media performance platform 430, a computing resource 435, a cloud computing environment 440, and a network 450. Devices of environment 400 may interconnect via wired connections, wireless connections, or a combination of wired and wireless connections.

Data source device 410 includes one or more devices capable of sending, receiving, generating, storing, processing, and/or providing information associated with predicting media metrics and/or performing media analytics. For example, data source device 410 may include a server (e.g., in a data center or a cloud computing environment), a data center (e.g., a multi-server micro data center), a workstation computer, a virtual machine (VM) provided in a cloud computing environment, or a similar type of device. In some implementations, data source device 410 may transmit data to be included in a data lake accessible to media performance platform 430. In some implementations, data source device 410 may include a computer and/or a server associated with one or more data reporting entities (e.g., media agencies, media data tracking entities, data management entities, and/or the like), such as may be owned and/or operated by an advertising agency, client, data manager, or the like.

User device 420 includes one or more devices capable of sending, receiving, generating, storing, processing, and/or providing information associated with predicting media metrics and/or performing media analytics. For example, user device 420 may include a communication and/or computing device, such as a computer (e.g., a desktop computer, a laptop computer, a tablet computer, a handheld computer, and/or the like), a mobile phone (e.g., a smart phone, a radiotelephone, and/or the like), a gaming device, a wearable communication device (e.g., a smart wristwatch, a pair of smart eyeglasses, and/or the like), or a similar type of device.

Media performance platform 430 includes one or more computing resources assigned to predict media metrics and/or perform media analytics. For example, media performance platform 430 may be a platform implemented by cloud computing environment 440 that may predict target CPP values for a currently executing media plan, based on the cost and/or quality KPIs of executed (e.g., past) media plans. In some implementations, media performance platform 430 is implemented by computing resources 435 of cloud computing environment 440.

While the example environment 400 indicates that media performance platform 430 is implemented in a cloud computing environment 440, in some implementations, media performance platform 430 may be implemented by one or more other types of devices as well, such as a server, computer, laptop computer, tablet computer, handheld computer, or the like.

Cloud computing environment 440 includes an environment that delivers computing as a service, whereby shared resources, services, and/or the like, may be provided to predict media metrics and/or perform media analytics. Cloud computing environment 440 may provide computation, software, data access, storage, and/or other services that do not require end-user knowledge of a physical location and configuration of a system and/or a device that delivers the services. As shown, cloud computing environment 440 may include media performance platform 430 and computing resource 435.

Computing resource 435 includes one or more personal computers, workstation computers, server devices, or other types of computation and/or communication devices. In some implementations, computing resource 435 may host media performance platform 430. The cloud resources may include compute instances executing in computing resource 435, storage devices provided in computing resource 435, data transfer devices provided by computing resource 435, and/or the like. In some implementations, computing resource 435 may communicate with other computing resources 435 via wired connections, wireless connections, or a combination of wired and wireless connections.

As further shown in FIG. 4, computing resource 435 may include a group of cloud resources, such as one or more applications ("APPs") 435-1, one or more virtual machines ("VMs") 435-2, virtualized storage ("VSs") 435-3, one or more hypervisors ("HYPs") 435-4, or the like.

Application 435-1 includes one or more software applications that may be provided to or accessed by user device 420. Application 435-1 may eliminate a need to install and execute the software applications on user device 420. For example, application 435-1 may include software associated with media performance platform 430 and/or any other software capable of being provided via cloud computing environment 440. In some implementations, one application 435-1 may send/receive information to/from one or more other applications 435-1, via virtual machine 435-2.

Virtual machine 435-2 includes a software implementation of a machine (e.g., a computer) that executes programs like a physical machine. Virtual machine 435-2 may be either a system virtual machine or a process virtual machine, depending upon use and degree of correspondence to any real machine by virtual machine 435-2. A system virtual machine may provide a complete system platform that supports execution of a complete operating system ("OS"). A process virtual machine may execute a single program, and may support a single process. In some implementations, virtual machine 435-2 may execute on behalf of a user (e.g., user device 420, media performance platform 430, and/or the like), and may manage infrastructure of cloud computing environment 440, such as data management, synchronization, or long-duration data transfers.

Virtualized storage 435-3 includes one or more storage systems and/or one or more devices that use virtualization techniques within the storage systems or devices of computing resource 435. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 435-4 provides hardware virtualization techniques that allow multiple operating systems (e.g., "guest operating systems") to execute concurrently on a host computer, such as computing resource 435. Hypervisor 435-4 may present a virtual operating platform to the guest operating systems, and may manage the execution of the guest operating systems. Multiple instances of a variety of operating systems may share virtualized hardware resources.

Network 450 includes one or more wired and/or wireless networks. For example, network 450 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
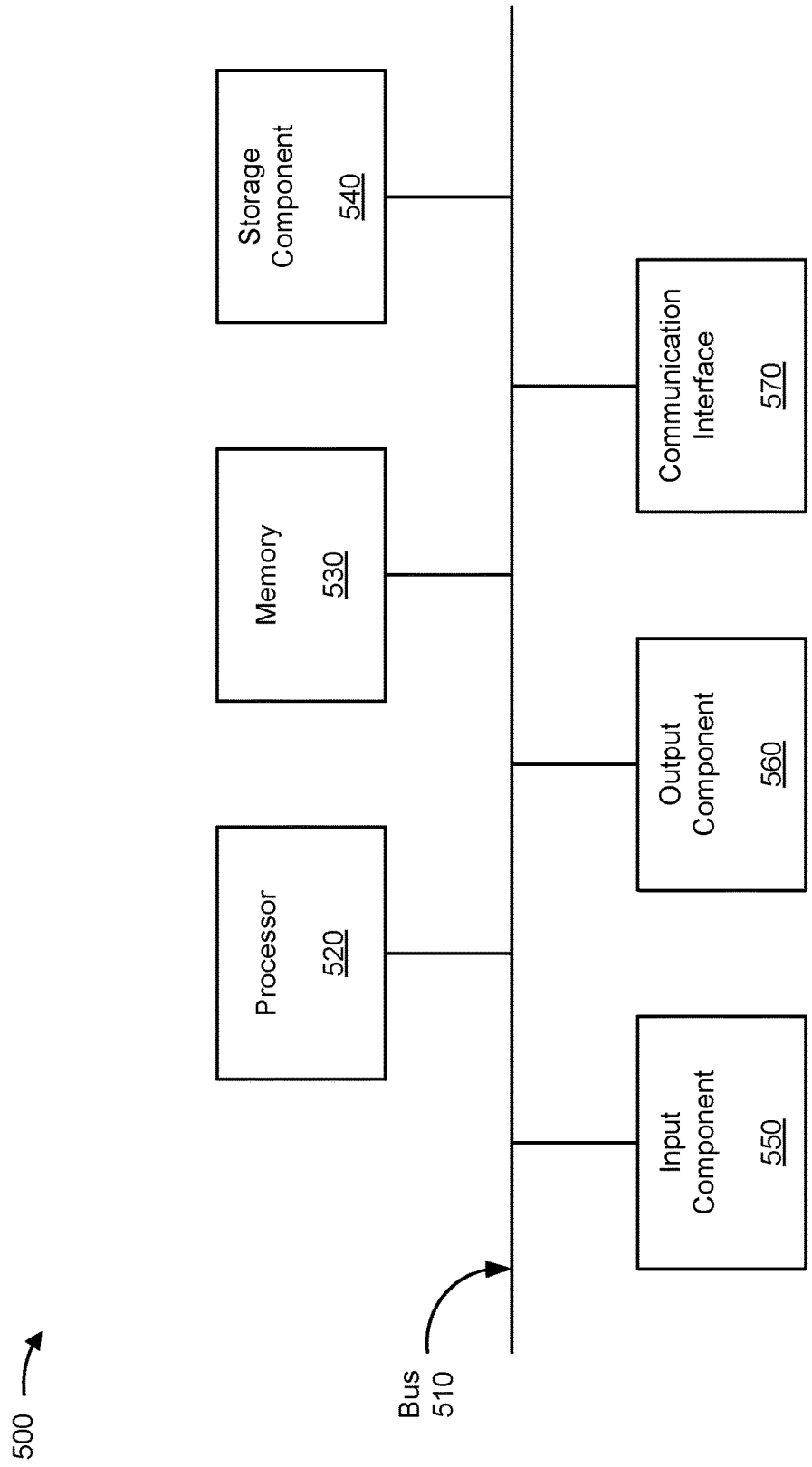
FIG. 5 is a diagram of example components of one or more devices of FIG. 4.

FIG. 5 is a diagram of example components of a device 500. Device 500 may correspond to data source device 410, user device 420, media performance platform 430, and/or computing resource 435. In some implementations, data source device 410, user device 420, media performance platform 430, and/or computing resource 435 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 is implemented in hardware, firmware, or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more light-emitting diodes (LEDs)).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, or the like.

Device 500 may perform one or more processes described herein. Device 500 may perform these processes based on processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
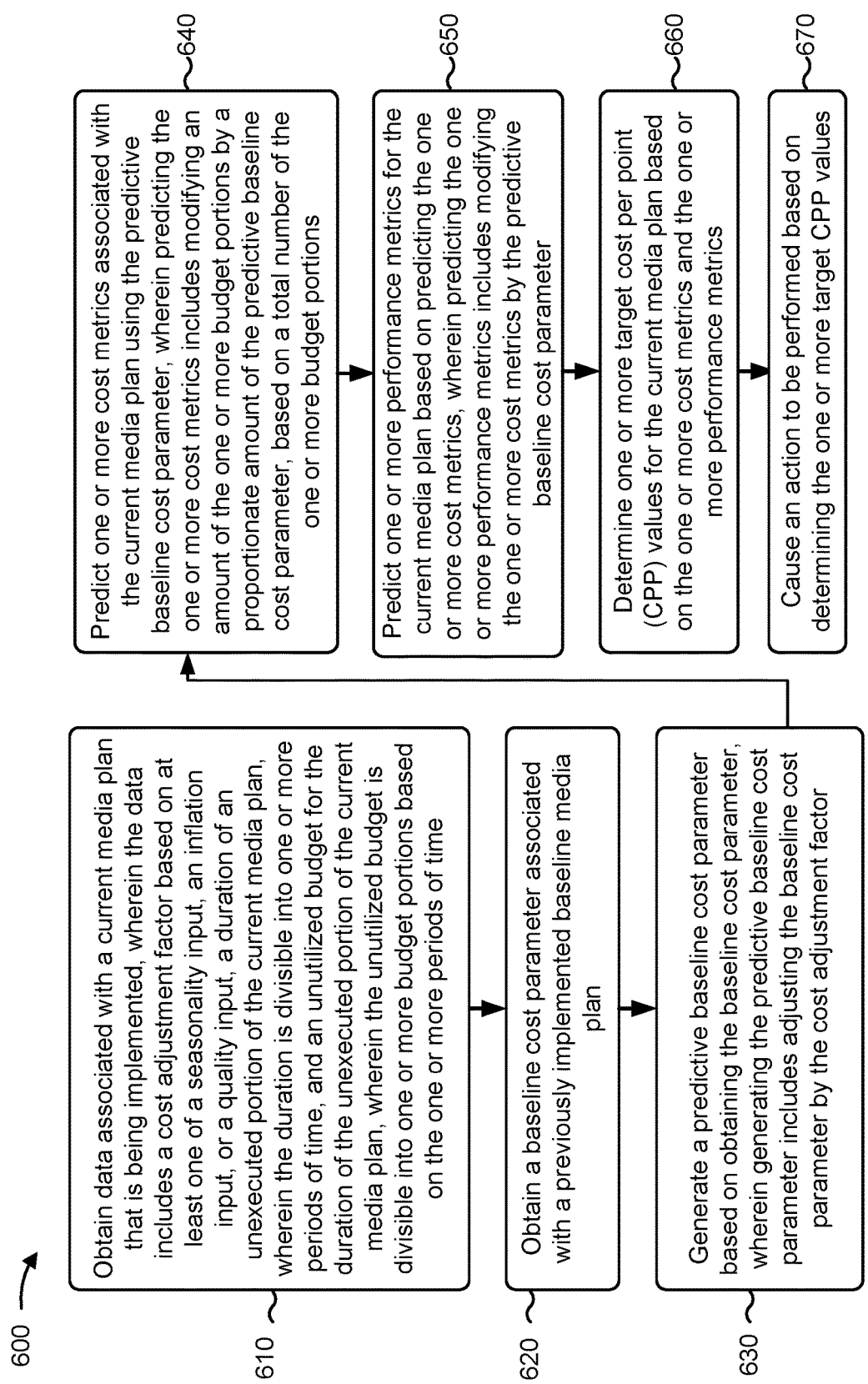
FIG. 6 is a flow chart of an example process for predicting media metrics and/or performing media analytics.

FIG. 6 is a flow chart of an example process 600 for predicting media metrics and/or performing media analytics. In some implementations, one or more process blocks of FIG. 6 may be performed by a media performance platform (e.g. media performance platform 430), or a computing resource (e.g., computing resource 435) associated with the media performance platform. In some implementations, one or more process blocks of FIG. 6 may be performed by another device or a group of devices separate from or including media performance platform (e.g. media performance platform 430), such as a data source device (e.g. data source device 410) or a user device (e.g. user device 420).

As shown in FIG. 6, process 600 may include obtaining data associated with a current media plan that is being implemented, wherein the data includes a cost adjustment factor based on at least one of a seasonality input, an inflation input, or a quality input, obtaining a duration of an unexecuted portion of the current media plan, wherein the duration is divisible into one or more periods of time, and obtaining an unutilized budget for the duration of the unexecuted portion of the current media plan, wherein the unutilized budget is divisible into one or more budget portions based on the one or more periods of time (block 610). For example, the media performance platform (e.g., using computing resource 435, processor 520, memory 530, storage component 540, input component 550, communication interface 570, and/or the like) may obtain data associated with a current media plan that is being implemented, as described above in connection with FIGS. 1A-3. In some implementations, the data may include a cost adjustment factor based on at least one of a seasonality input, an inflation input, and/or a quality input, may include a duration of an unexecuted portion of the current media plan, and may include an unutilized budget for the duration of the unexecuted portion of the current media plan. In some implementations, the duration may be divisible into one or more periods of time. In some implementations, the unutilized budget may be divisible into one or more budget portions based on the one or more periods of time.

As further shown in FIG. 6, process 600 may include obtaining a baseline cost parameter associated with a previously implemented baseline media plan (block 620). For example, the media performance platform (e.g., using computing resource 435, processor 520, memory 530, storage component 540, input component 550, communication interface 570, and/or the like) may obtain a baseline cost parameter associated with a previously implemented baseline media plan, as described above in connection with FIGS. 1A-3.

As further shown in FIG. 6, process 600 may include generating a predictive baseline cost parameter based on obtaining the baseline cost parameter, wherein generating the predictive baseline cost parameter includes adjusting the baseline cost parameter by the cost adjustment factor (block 630). For example, the media performance platform (e.g., using computing resource 435, processor 520, memory 530, storage component 540, and/or the like) may generate a predictive baseline cost parameter based on obtaining the baseline cost parameter, as described above in connection with FIGS. 1A-3. In some implementations, when generating the predictive baseline cost parameter, the media performance platform may adjust the baseline cost parameter by the cost adjustment factor.

As further shown in FIG. 6, process 600 may include predicting one or more cost metrics associated with the current media plan using the predictive baseline cost parameter, wherein predicting the one or more cost metrics includes modifying an amount of the one or more budget portions by a proportionate amount of the predictive baseline cost parameter, based on a total number of the one or more budget portions (block 640). For example, the media performance platform (e.g., using computing resource 435, processor 520, memory 530, storage component 540, and/or the like) may predict one or more cost metrics associated with the current media plan using the predictive baseline cost parameter, as described above in connection with FIGS. 1A-3. In some implementations, when predicting the one or more cost metrics, the media performance platform may modify an amount of the one or more budget portions by a proportionate amount of the predictive baseline cost parameter, based on a total number of the one or more budget portions.

As further shown in FIG. 6, process 600 may include predicting one or more performance metrics for the current media plan based on predicting the one or more cost metrics, wherein predicting the one or more performance metrics includes modifying the one or more cost metrics by the predictive baseline cost parameter (block 650). For example, the media performance platform (e.g., using computing resource 435, processor 520, memory 530, storage component 540, and/or the like) may predict one or more performance metrics for the current media plan based on predicting the one or more cost metrics, as described above in connection with FIGS. 1A-3. In some implementations, when predicting the one or more performance metrics, the media performance platform may modify the one or more cost metrics by the predictive baseline cost parameter.

As further shown in FIG. 6, process 600 may include determining one or more target CPP values for the current media plan based on the one or more cost metrics and the one or more performance metrics (block 660). For example, the media performance platform (e.g., using computing resource 435, processor 520, memory 530, storage component 540, and/or the like) may determine one or more target CPP values for the current media plan based on the one or more cost metrics and the one or more performance metrics, as described above in connection with FIGS. 1A-3.

As further shown in FIG. 6, process 600 may include causing an action to be performed based on determining the one or more target CPP values (block 670). For example, the media performance platform (e.g., using computing resource 435, processor 520, memory 530, storage component 540, input component 550, output component 560, communication interface 570, and/or the like) may cause an action to be performed based on determining the one or more target CPP values, as described above in connection with FIGS. 1A-3.

Process 600 may include additional implementations, such as any single implementation or any combination of implementations described below and/or in connection with one or more other processes described elsewhere herein.

In some implementations, the media performance platform may obtain an actual cost associated with an executed portion of the current media plan, may determine an amount of savings based on adjusting the actual cost by the predicted baseline cost parameter, may dynamically adjust the one or more cost metrics to include the amount of savings, may dynamically update the one or more performance metrics based on adjusting the one or more cost metrics, and may dynamically update the one or more target CPP values based on updating the one or more performance metrics.

In some implementations, the media performance platform may receive a request to modify at least one of the quality input, the seasonality input, or the inflation input associated with the cost adjustment factor, may dynamically update the cost adjustment factor based on the request, may dynamically generate an updated predicted baseline cost parameter based on updating the cost adjustment factor, may dynamically determine an updated amount of savings based on generating the updated predicted baseline cost parameter, may dynamically update the one or more cost metrics to include the updated amount of savings, may dynamically update the one or more performance metrics based on updating the one or more cost metrics, and may dynamically update the one or more target CPP values based on updating the one or more performance metrics.

In some implementations, the media performance platform may receive a request to modify the amount of savings, may dynamically determine an updated amount of savings based on the request, may dynamically update the one or more cost metrics to include the updated amount of savings, may dynamically update the one or more performance metrics based on updating the one or more cost metrics, and may dynamically update the one or more target CPP values based on updating the one or more performance metrics.

In some implementations, the media performance platform may receive a request to modify an amount of the unutilized budget, may dynamically update the one or more cost metrics based on the request, may dynamically updating the one or more performance metrics based on updating the one or more cost metrics, and may dynamically update one or more of the target CPP values based on updating the one or more performance metrics In some implementations, the seasonality input may be based on a seasonality index value associated with the current media plan, the quality input may be based on a result of comparing an expected KPI parameter associated with the current media plan and an actual KPI parameter obtained for the current media plan, and the inflation input may be based on an amount of monetary inflation incurred between execution of the baseline media plan and the current media plan.

In some implementations, the action may include visually displaying the target CPP values associated with the current media plan, generating a report based on the target CPP values associated with the current media plan, or altering the current media plan. In some implementations, the one or more target CPP values may be associated with a specific media channel specified in the current media plan. In some implementations, the one or more target CPP values may be associated with a specific audience specified in the current media plan.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
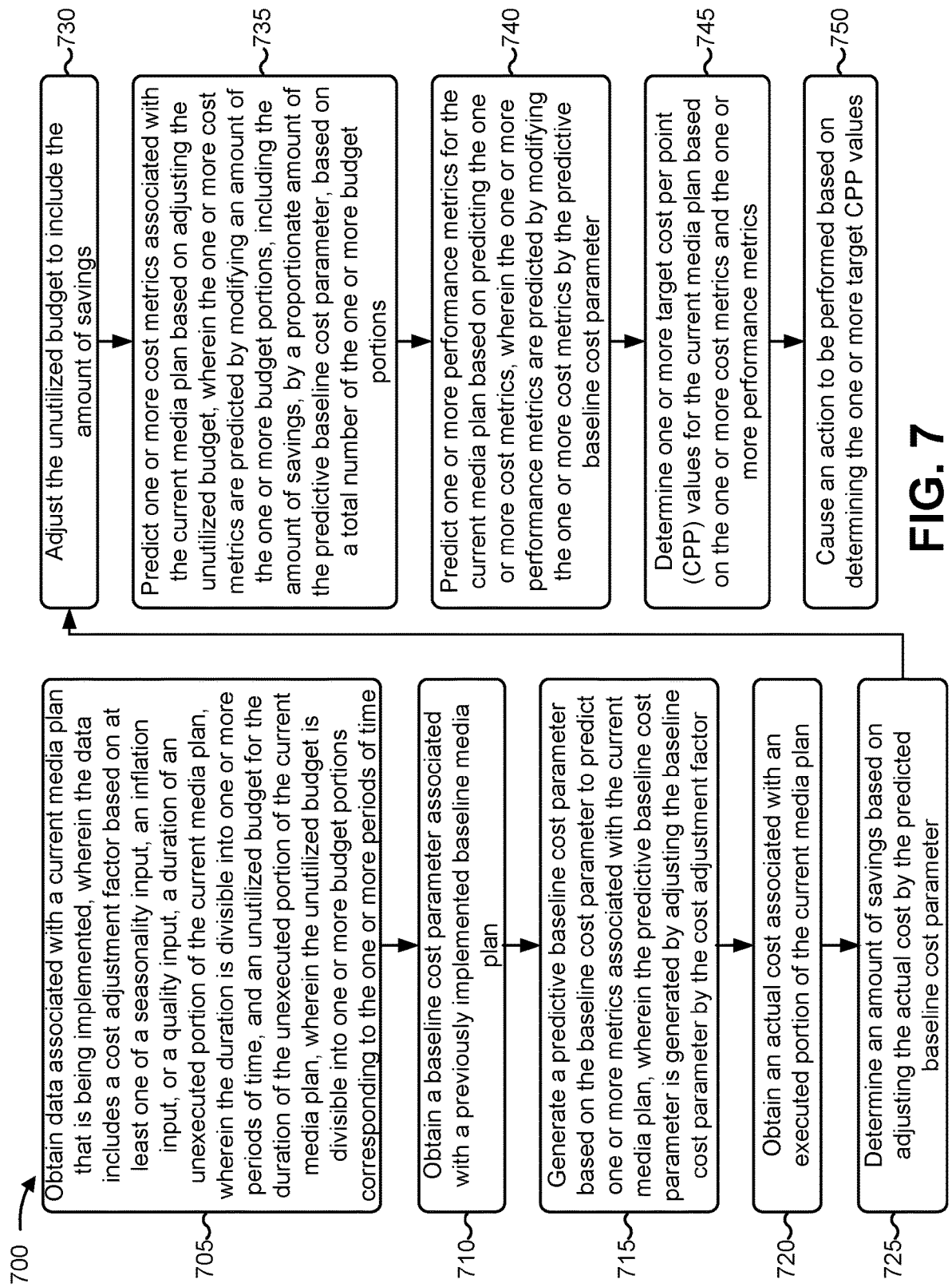
FIG. 7 is a flow chart of an example process for predicting media metrics and/or performing media analytics.

FIG. 7 is a flow chart of an example process 700 predicting media metrics and/or performing media analytics. In some implementations, one or more process blocks of FIG. 7 may be performed by a media performance platform (e.g. media performance platform 430), or a computing resource (e.g. computing resource 435) of the media performance platform. In some implementations, one or more process blocks of FIG. 7 may be performed by another device or a group of devices separate from or including media performance platform (e.g. media performance platform 430), such as a data source device (e.g. data source device 410) or a user device (e.g. user device 420).

As shown in FIG. 7, process 700 may include obtaining data associated with a current media plan that is being implemented, wherein the data includes a cost adjustment factor based on at least one of a seasonality input, an inflation input, or a quality input, a duration of an unexecuted portion of the current media plan, wherein the duration is divisible into one or more periods of time, and an unutilized budget for the duration of the unexecuted portion of the current media plan, wherein the unutilized budget is divisible into one or more budget portions corresponding to the one or more periods of time (block 705). For example, the media performance platform (e.g., using computing resource 435, processor 520, memory 530, storage component 540, input component 550, communication interface 570, and/or the like) may obtain data associated with a current media plan that is being implemented, as described above in connection with FIGS. 1A-3. In some implementations, the data may include a cost adjustment factor based on at least one of a seasonality input, an inflation input, or a quality input, may include a duration of an unexecuted portion of the current media plan, and may include an unutilized budget for the duration of the unexecuted portion of the current media plan. In some implementations, the duration may be divisible into one or more periods of time. In some implementations, the unutilized budget may be divisible into one or more budget portions corresponding to the one or more periods of time.

As further shown in FIG. 7, process 700 may include obtaining a baseline cost parameter associated with a previously implemented baseline media plan (block 710). For example, the media performance platform (e.g., using computing resource 435, processor 520, memory 530, storage component 540, input component 550, communication interface 570, and/or the like) may obtain a baseline cost parameter associated with a previously implemented baseline media plan, as described above in connection with FIGS. 1A-3.

As further shown in FIG. 7, process 700 may include generating a predictive baseline cost parameter based on the baseline cost parameter to predict one or more metrics associated with the current media plan, wherein the predictive baseline cost parameter is generated by adjusting the baseline cost parameter by the cost adjustment factor (block 715). For example, the media performance platform (e.g., using computing resource 435, processor 520, memory 530, storage component 540, and/or the like) may generate a predictive baseline cost parameter based on the baseline cost parameter to predict one or more metrics associated with the current media plan, as described above in connection with FIGS. 1A-3. In some implementations, the media performance platform may generate the predictive baseline cost parameter by adjusting the baseline cost parameter by the cost adjustment factor.

As further shown in FIG. 7, process 700 may include obtaining an actual cost associated with an executed portion of the current media plan (block 720). For example, the media performance platform (e.g., using computing resource 435, processor 520, memory 530, storage component 540, input component 550, communication interface 570, and/or the like) may obtain an actual cost associated with an executed portion of the current media plan, as described above in connection with FIGS. 1A-3.

As further shown in FIG. 7, process 700 may include determining an amount of savings based on adjusting the actual cost by the predicted baseline cost parameter (block 725). For example, the media performance platform (e.g., using computing resource 435, processor 520, memory 530, storage component 540, and/or the like) may determine an amount of savings based on adjusting the actual cost by the predicted baseline cost parameter, as described above in connection with FIGS. 1A-3.

As further shown in FIG. 7, process 700 may include adjusting the unutilized budget to include the amount of savings (block 730). For example, the media performance platform (e.g., using computing resource 435, processor 520, memory 530, storage component 540, and/or the like) may adjust the unutilized budget to include the amount of savings, as described above in connection with FIGS. 1A-3.

As further shown in FIG. 7, process 700 may include predicting one or more cost metrics associated with the current media plan based on adjusting the unutilized budget, wherein the one or more cost metrics are predicted by modifying an amount of the one or more budget portions, including the amount of savings, by a proportionate amount of the predictive baseline cost parameter, based on a total number of the one or more budget portions (block 735). For example, the media performance platform (e.g., using computing resource 435, processor 520, memory 530, storage component 540, and/or the like) may predict one or more cost metrics associated with the current media plan based on adjusting the unutilized budget, as described above in connection with FIGS. 1A-3. In some implementations, the media performance platform may predict the one or more cost metrics by modifying an amount of the one or more budget portions, including the amount of savings, by a proportionate amount of the predictive baseline cost parameter, based on a total number of the one or more budget portions.

As further shown in FIG. 7, process 700 may include predicting one or more performance metrics for the current media plan based on predicting the one or more cost metrics, wherein the one or more performance metrics are predicted by modifying the one or more cost metrics by the predictive baseline cost parameter (block 740). For example, the media performance platform (e.g., using computing resource 435, processor 520, memory 530, storage component 540, and/or the like) may predict one or more performance metrics for the current media plan based on predicting the one or more cost metrics, as described above in connection with FIGS. 1A-3. In some implementations, the media performance platform may predict the one or more performance metrics by modifying the one or more cost metrics by the predictive baseline cost parameter.

As further shown in FIG. 7, process 700 may include determining one or more target CPP values for the current media plan based on the one or more cost metrics and the one or more performance metrics (block 745). For example, the media performance platform (e.g., using computing resource 435, processor 520, memory 530, storage component 540, and/or the like) may determine one or more target CPP values for the current media plan based on the one or more cost metrics and the one or more performance metrics, as described above in connection with FIGS. 1A-3.

As further shown in FIG. 7, process 700 may include causing an action to be performed based on determining the one or more target CPP values (block 750). For example, the media performance platform (e.g., using computing resource 435, processor 520, memory 530, storage component 540, input component 550, output component 560, communication interface 570, and/or the like) may cause an action to be performed based on determining the one or more target CPP values, as described above in connection with FIGS. 1A-3.

Process 700 may include additional implementations, such as any single implementation or any combination of implementations described below and/or in connection with one or more other processes described elsewhere herein.

In some implementations, the media performance platform may receive a request to modify at least one of the quality input, the seasonality input, or the inflation input associated with the cost adjustment factor, may dynamically update the cost adjustment factor based on the request, may dynamically generate an updated predicted baseline cost parameter based on updating the cost adjustment factor, may dynamically determine an updated amount of savings based on generating the updated predicted baseline cost parameter, may dynamically update the one or more cost metrics to include the updated amount of savings, may dynamically update the one or more performance metrics based on updating the one or more cost metrics, and may dynamically update the one or more the target CPP values based on updating the one or more performance metrics In some implementations, the media performance platform may receive a request to modify the amount of savings, may dynamically determine an updated amount of savings based on the request, may dynamically update the one or more cost metrics to include the updated amount of savings, may dynamically update the one or more performance metrics based on updating the one or more cost metrics, and may dynamically update the one or more target CPP values based on updating the one or more performance metrics.

In some implementations, the media performance platform may receive a request to modify an amount of the unutilized budget, may dynamically update the one or more cost metrics based on the request, may dynamically update the one or more performance metrics based updating the one or more cost metrics, and may dynamically update one or more target CPP values based on updating the one or more performance metrics.

In some implementations, the seasonality input may be based on a seasonality index value associated with the current media plan, the quality input may be based on a result of comparing an expected KPI parameter associated with the current media plan and an actual KPI parameter obtained for the current media plan, and the inflation input may be based on an amount of monetary inflation incurred between execution of the baseline media plan and the current media plan.

In some implementations, the one or more target CPP values may be associated with a specific media channel specified in the current media plan. In some implementations, the one or more target CPP values are associated with a specific audience specified in the current media plan.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8A:
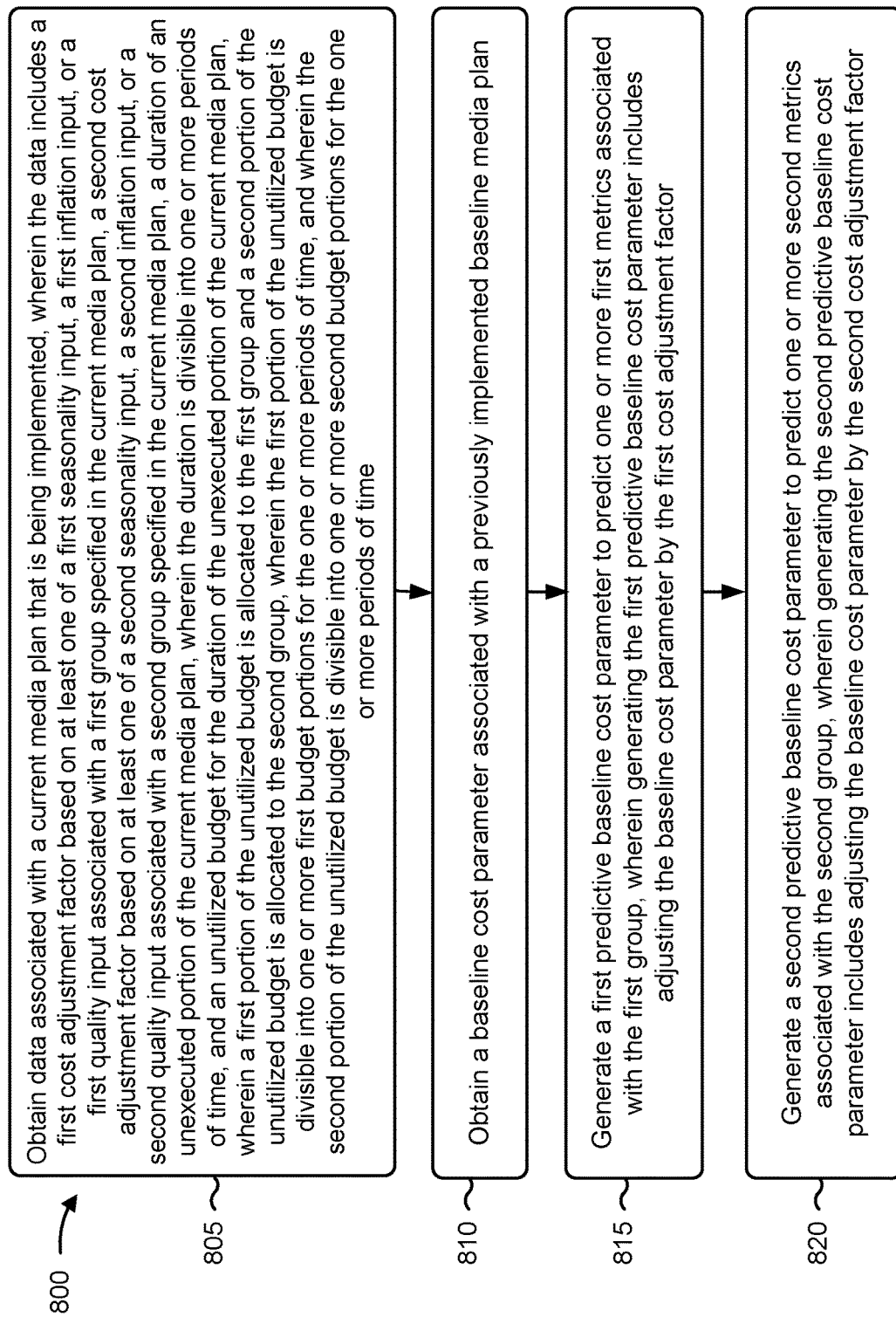
FIGS. 8A and 8B are a flow chart of an example process for predicting media metrics and/or performing media analytics.
Figure 8B:
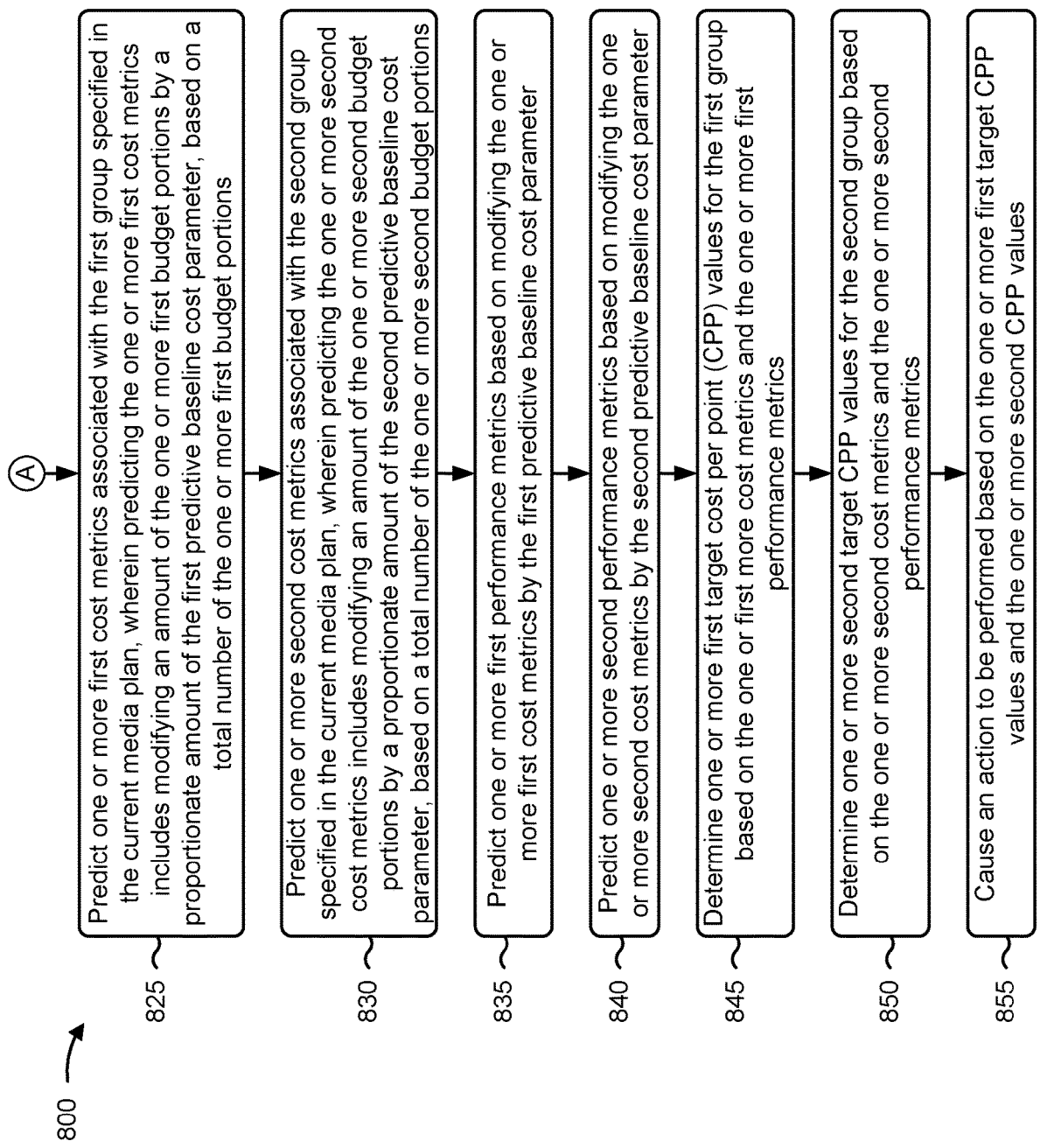

FIGS. 8A-8B are a flow chart of an example process 800 predicting media metrics and/or performing media analytics. In some implementations, one or more process blocks of FIGS. 8A-8B may be performed by a media performance platform (e.g. media performance platform 430), or a computing resource (e.g., computing resource 435) of the media performance platform. In some implementations, one or more process blocks of FIGS. 8A-8B may be performed by another device or a group of devices separate from or including media performance platform (e.g. media performance platform 430), such as a data source device (e.g. data source device 410) or a user device (e.g. user device 420).

As shown in FIG. 8A, process 800 may include obtaining data associated with a current media plan that is being implemented, wherein the data includes a first cost adjustment factor based on at least one of a first seasonality input, a first inflation input, or a first quality input associated with a first group specified in the current media plan, a second cost adjustment factor based on at least one of a second seasonality input, a second inflation input, or a second quality input associated with a second group specified in the current media plan, a duration of an unexecuted portion of the current media plan, wherein the duration is divisible into one or more periods of time, and an unutilized budget for the duration of the unexecuted portion of the current media plan, wherein a first portion of the unutilized budget is allocated to the first group and a second portion of the unutilized budget is allocated to the second group, wherein the first portion of the unutilized budget is divisible into one or more first budget portions for the one or more periods of time, and wherein the second portion of the unutilized budget is divisible into one or more second budget portions for the one or more periods of time (block 805). For example, the media performance platform (e.g., using computing resource 435, processor 520, memory 530, storage component 540, input component 550, communication interface 570, and/or the like) may obtain data associated with a current media plan that is being implemented, as described above in connection with FIGS. 1A-3. In some implementations, the data may include a first cost adjustment factor based on at least one of a first seasonality input, a first inflation input, or a first quality input associated with a first group specified in the current media plan, a second cost adjustment factor based on at least one of a second seasonality input, a second inflation input, or a second quality input associated with a second group specified in the current media plan, a duration of an unexecuted portion of the current media plan, and an unutilized budget for the duration of the unexecuted portion of the current media plan. In some implementations, the duration may be divisible into one or more periods of time. In some implementations, a first portion of the unutilized budget may be allocated to the first group and a second portion of the unutilized budget is allocated to the second group. In some implementations, the first portion of the unutilized budget may be divisible into one or more first budget portions for the one or more periods of time. In some implementations, the second portion of the unutilized budget may be divisible into one or more second budget portions for the one or more periods of time.

As further shown in FIG. 8A, process 800 may include obtaining a baseline cost parameter associated with a previously implemented baseline media plan (block 810). For example, the media performance platform (e.g., using computing resource 435, processor 520, memory 530, storage component 540, input component 550, communication interface 570, and/or the like) may obtain a baseline cost parameter associated with a previously implemented baseline media plan, as described above in connection with FIGS. 1A-3.

As further shown in FIG. 8A, process 800 may include generating a first predictive baseline cost parameter to predict one or more first metrics associated with the first group, wherein generating the first predictive baseline cost parameter includes adjusting the baseline cost parameter by the first cost adjustment factor (block 815). For example, the media performance platform (e.g., using computing resource 435, processor 520, memory 530, storage component 540, and/or the like) may generate a first predictive baseline cost parameter to predict one or more first metrics associated with the first group, as described above in connection with FIGS. 1A-3. In some implementations, when generating the first predictive baseline cost parameter, the media performance platform may adjust the baseline cost parameter by the first cost adjustment factor.

As further shown in FIG. 8A, process 800 may include generating a second predictive baseline cost parameter to predict one or more second metrics associated with the second group, wherein generating the second predictive baseline cost parameter includes adjusting the baseline cost parameter by the second cost adjustment factor (block 820). For example, the media performance platform (e.g., using computing resource 435, processor 520, memory 530, storage component 540, and/or the like) may generate a second predictive baseline cost parameter to predict one or more second metrics associated with the second group, as described above in connection with FIGS. 1A-3. In some implementations, when generating the second predictive baseline cost parameter, the media performance platform may adjust the baseline cost parameter by the second cost adjustment factor.

As shown in FIG. 8B, process 800 may include predicting one or more first cost metrics associated with the first group specified in the current media plan, wherein predicting the one or more first cost metrics includes modifying an amount of the one or more first budget portions by a proportionate amount of the first predictive baseline cost parameter, based on a total number of the one or more first budget portions (block 825). For example, the media performance platform (e.g., using computing resource 435, processor 520, memory 530, storage component 540, and/or the like) may predict one or more first cost metrics associated with the first group specified in the current media plan, as described above in connection with FIGS. 1A-3. In some implementations, when predicting the one or more first cost metrics, the media performance platform may modify an amount of the one or more first budget portions by a proportionate amount of the first predictive baseline cost parameter, based on a total number of the one or more first budget portions.

As further shown in FIG. 8B, process 800 may include predicting one or more second cost metrics associated with the second group specified in the current media plan, wherein predicting the one or more second cost metrics includes modifying an amount of the one or more second budget portions by a proportionate amount of the second predictive baseline cost parameter, based on a total number of the one or more second budget portions (block 830). For example, the media performance platform (e.g., using computing resource 435, processor 520, memory 530, storage component 540, and/or the like) may predict one or more second cost metrics associated with the second group specified in the current media plan, as described above in connection with FIGS. 1A-3. In some implementations, when predicting the one or more second cost metrics, the media performance platform may modify an amount of the one or more second budget portions by a proportionate amount of the second predictive baseline cost parameter, based on a total number of the one or more second budget portions.

As further shown in FIG. 8B, process 800 may include predicting one or more first performance metrics based on modifying the one or more first cost metrics by the first predictive baseline cost parameter (block 835). For example, the media performance platform (e.g., using computing resource 435, processor 520, memory 530, storage component 540, and/or the like) may predict one or more first performance metrics based on modifying the one or more first cost metrics by the first predictive baseline cost parameter, as described above in connection with FIGS. 1A-3.

As further shown in FIG. 8B, process 800 may include predicting one or more second performance metrics based on modifying the one or more second cost metrics by the second predictive baseline cost parameter (block 840). For example, the media performance platform (e.g., using computing resource 435, processor 520, memory 530, storage component 540, and/or the like) may predict one or more second performance metrics based on modifying the one or more second cost metrics by the second predictive baseline cost parameter, as described above in connection with FIGS. 1A-3.

As further shown in FIG. 8B, process 800 may include determining one or more first target CPP values for the first group based on the one or first more cost metrics and the one or more first performance metrics (block 845). For example, the media performance platform (e.g., using computing resource 435, processor 520, memory 530, storage component 540, and/or the like) may determine one or more first target CPP values for the first group based on the one or first more cost metrics and the one or more first performance metrics, as described above in connection with FIGS. 1A-3.

As further shown in FIG. 8B, process 800 may include determining one or more second target CPP values for the second group based on the one or more second cost metrics and the one or more second performance metrics (block 850). For example, the media performance platform (e.g., using computing resource 435, processor 520, memory 530, storage component 540, input component 550, communication interface 570, and/or the like) may determine one or more second target CPP values for the second group based on the one or more second cost metrics and the one or more second performance metrics, as described above in connection with FIGS. 1A-3.

As further shown in FIG. 8B, process 800 may include causing an action to be performed based on the one or more first target CPP values and the one or more second target CPP values (block 855). For example, the media performance platform (e.g., using computing resource 435, processor 520, memory 530, storage component 540, input component 550, output component 560, communication interface 570, and/or the like) may cause an action to be performed based on the one or more first target CPP values and the one or more second target CPP values, as described above in connection with FIGS. 1A-3.

Process 800 may include additional implementations, such as any single implementation or any combination of implementations described below and/or in connection with one or more other processes described elsewhere herein.

In some implementations, the first group may be associated with a first demographic in a first country and the second group may be associated with the first demographic in a second country. In some implementations, the first group may be associated with a first media channel in a first country and the second group may be associated with the first media channel in a second country.

In some implementations, the first group may be associated with a first country, the second group may be associated with a second country, the first seasonality input may be based on a first seasonality index value associated with the first country, the first quality input may be based on a difference between a first expected KPI parameter and a first actual KPI parameter for the first country, the first inflation input may be based on an amount of monetary inflation incurred between execution of the baseline media plan and the current media plan for the first country, the second seasonality input may be based on a second seasonality index value associated with the second country, the second quality input may be based on a difference between a second expected second KPI parameter and a second actual KPI parameter for the second country, and the second inflation input may be based on an amount of monetary inflation incurred between execution of the baseline media plan and the current media plan for the second country.

Although FIGS. 8A-8B shows example blocks of process 800, in some implementations, process 800 may include additional blocks, fewer blocks, different blocks, or differently arranged blocks than those depicted in FIGS. 8A-8B. Additionally, or alternatively, two or more of the blocks of process 800 may be performed in parallel.

Some implementations described herein provide a media performance platform 430 including a predictive engine 316, configured to perform rigorous data analytics for predicting efficiency metrics associated with a future of a currently executing media plan. In this way, a user may have a finger on the pulse of the currently executing media plan, at various levels of granularity, as well as having predictive insight regarding the future of the currently executing media plan, by which to target performance, optimize spending, and/or the like. The predictive engine may also facilitate scenario planning based on historic media plan data and currently executing media plan data, whereby the user may adjust quality inputs, budget allocation, and/or the like, to dynamically predict alternative metrics for the currently executing media plan. In this way, the user may gain intelligent insight into alternative scenarios that may be achievable for the future of a currently executing media plan, by which the user may elect to change a course in which the currently executing media plan is headed, and pursue one of the alternative scenarios. In this way, computing resources devoted to determining, generating, presenting, and/or reporting extraneous, non-insightful media data may be obviated. Currently, there does not exist a technique for employing analytics to make intelligent predictions for future metrics associated with a currently executing media plan, by which the plan may be modified, redefined, and/or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, and/or the like). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A method, comprising:
    obtaining, by a device, data associated with a current media plan that is being implemented,
        wherein the data includes:
            a cost adjustment factor based on at least one of:
                a seasonality input,
                an inflation input, or
                a quality input,
            a duration of an unexecuted portion of the current media plan, wherein the duration is divisible into one or more periods of time, and
an unutilized budget for the duration of the unexecuted portion of the current media plan;
obtaining, by the device, a baseline cost parameter associated with a previously implemented baseline media plan;
generating, by the device, a predictive baseline cost parameter based on obtaining the baseline cost parameter,
wherein generating the predictive baseline cost parameter includes adjusting the baseline cost parameter by the cost adjustment factor;
predicting, by the device, one or more cost metrics associated with the current media plan using the predictive baseline cost parameter,
wherein predicting the one or more cost metrics includes modifying an amount of one or more budget portions of the unutilized budget by a proportionate amount of the predictive baseline cost parameter, based on a total number of the one or more budget portions;
predicting, by the device, one or more performance metrics for the current media plan based on predicting the one or more cost metrics,
wherein predicting the one or more performance metrics includes modifying the one or more cost metrics by the predictive baseline cost parameter;
determining, by the device, one or more target cost per point (CPP) values for the current media plan based on the one or more cost metrics and the one or more performance metrics;
causing, by the device, an action to be performed based on determining the one or more target CPP values;
providing, by the device, a user interface for receiving user input to adjust one or more quality inputs;
receiving, by the device, modified user input associating with adjusting the one or more quality inputs;
dynamically adjusting, by the device, the one or more cost metrics based on receiving the modified user input;
dynamically updating, by the device, the one or more performance metrics based on dynamically adjusting the one or more cost metrics; and
dynamically updating, by the device, the one or more target CPP values based on dynamically updating the one or more performance metrics,
wherein the dynamically adjusted one or more cost metrics, the dynamically updated one or more performance metrics, and the dynamically updated one or more target CPP values are provided for display in real-time via the user interface, and
wherein the dynamically adjusted one or more cost metrics, the dynamically updated one or more performance metrics, and the dynamically updated one or more target CPP values improve efficiency associated with the device.

2. The method of claim 1, further comprising:
obtaining an actual cost associated with an executed portion of the current media plan; and
determining an amount of savings based on adjusting the actual cost by the predicted baseline cost parameter,
wherein dynamically adjusting the one or more cost metrics comprises,
dynamically adjusting the one or more cost metrics to include the amount of savings.

3. The method of claim 2, further comprising:
receiving a request to modify at least one of the quality input, the seasonality input, or the inflation input associated with the cost adjustment factor;
dynamically updating the cost adjustment factor based on the request;
dynamically generating an updated predicted baseline cost parameter based on updating the cost adjustment factor;
dynamically determining an updated amount of savings based on generating the updated predicted baseline cost parameter;
dynamically updating the one or more cost metrics to include the updated amount of savings; and
dynamically updating the one or more performance metrics based on updating the one or more cost metrics.

4. The method of claim 2, further comprising:
receiving a request to modify the amount of savings;
dynamically determining an updated amount of savings based on the request; and
dynamically updating the one or more cost metrics to include the updated amount of savings; and
dynamically updating the one or more performance metrics based on updating the one or more cost metrics.

5. The method of claim 1, further comprising:
receiving a request to modify an amount of the unutilized budget;
dynamically updating the one or more cost metrics based on the request; and
dynamically updating the one or more performance metrics based on updating the one or more cost metrics.

6. The method of claim 1, wherein:
the seasonality input is based on a seasonality index value associated with the current media plan,
the quality input is based on a result of comparing an expected key performance indicator (KPI) parameter associated with the current media plan and an actual KPI parameter obtained for the current media plan, and
the inflation input is based on an amount of monetary inflation incurred between execution of the baseline media plan and the current media plan.

7. The method of claim 1, wherein the action includes one of:
visually displaying the target CPP values associated with the current media plan,
generating a report based on the target CPP values associated with the current media plan, or
altering the current media plan.

8. The method of claim 1, wherein the one or more target CPP values are associated with a specific media channel specified in the current media plan.

9. The method of claim 1, wherein the one or more target CPP values are associated with a specific audience specified in the current media plan.

10. A device, comprising:
one or more memories; and
one or more processors, communicatively coupled to the one or more memories, to:
obtain data associated with a current media plan that is being implemented,
wherein the data includes:
a cost adjustment factor based on at least one of:
a seasonality input,
an inflation input, or
a quality input,
a duration of an unexecuted portion of the current media plan, wherein the duration is divisible into one or more periods of time, and
an unutilized budget for the duration of the unexecuted portion of the current media plan;
obtain a baseline cost parameter associated with a previously implemented baseline media plan;
generate a predictive baseline cost parameter based on the baseline cost parameter to predict one or more metrics associated with the current media plan,
wherein the predictive baseline cost parameter is generated by adjusting the baseline cost parameter by the cost adjustment factor;
obtain an actual cost associated with an executed portion of the current media plan;
determine an amount of savings based on adjusting the actual cost by the predicted baseline cost parameter;
adjust the unutilized budget to include the amount of savings;
predict one or more cost metrics associated with the current media plan based on adjusting the unutilized budget,
wherein the one or more cost metrics are predicted by modifying an amount of one or more budget portions of the unutilized budget, including the amount of savings, by a proportionate amount of the predictive baseline cost parameter, based on a total number of the one or more budget portions;
predict one or more performance metrics for the current media plan based on predicting the one or more cost metrics,
wherein the one or more performance metrics are predicted by modifying the one or more cost metrics by the predictive baseline cost parameter;
determine one or more target cost per point (CPP) values for the current media plan based on the one or more cost metrics and the one or more performance metrics;
cause an action to be performed based on determining the one or more target CPP values;
provide a user interface for receiving user input to adjust one or more quality inputs;
receive modified user input associating with adjusting the one or more quality inputs;
dynamically adjust the one or more cost metrics based on receiving the modified user input;
dynamically update the one or more performance metrics based on dynamically adjusting the one or more cost metrics; and
dynamically update the one or more target CPP values based on dynamically updating the one or more performance metrics,
wherein the dynamically adjusted one or more cost metrics, the dynamically updated one or more performance metrics, and the dynamically updated one or more target CPP values are provided for display in real-time via the user interface, and
wherein the dynamically adjusted one or more cost metrics, the dynamically updated one or more performance metrics, and the dynamically updated one or more target CPP values improve efficiency associated with the device.

11. The device of claim 10, wherein the one or more processors are further to:
receive a request to modify at least one of the quality input, the seasonality input, or the inflation input associated with the cost adjustment factor;
dynamically update the cost adjustment factor based on the request;
dynamically generate an updated predicted baseline cost parameter based on updating the cost adjustment factor;
dynamically determine an updated amount of savings based on generating the updated predicted baseline cost parameter;
dynamically update the one or more cost metrics to include the updated amount of savings; and
dynamically update the one or more performance metrics based on updating the one or more cost metrics.

12. The device of claim 10, wherein the one or more processors are further to:
receive a request to modify the amount of savings;
dynamically determine an updated amount of savings based on the request;
dynamically update the one or more cost metrics to include the updated amount of savings; and
dynamically update the one or more performance metrics based on updating the one or more cost metrics.

13. The device of claim 10, wherein the one or more processors are further to:
receive a request to modify an amount of the unutilized budget;
dynamically update the one or more cost metrics based on the request; and
dynamically update the one or more performance metrics based updating the one or more cost metrics.

14. The device of claim 10, wherein:
the seasonality input is based on a seasonality index value associated with the current media plan,
the quality input is based on a result of comparing an expected key performance indicator (KPI) parameter associated with the current media plan and an actual KPI parameter obtained for the current media plan, and
the inflation input is based on an amount of monetary inflation incurred between execution of the baseline media plan and the current media plan.

15. The device of claim 10, wherein the one or more target CPP values are associated with a specific media channel specified in the current media plan.

16. The device of claim 10, wherein the one or more target CPP values are associated with a specific audience specified in the current media plan.

17. A non-transitory computer-readable medium storing instructions, the instructions comprising:
one or more instructions that, when executed by one or more processors, cause the one or more processors of a device to:
obtain data associated with a current media plan that is being implemented,
wherein the data includes:
a first cost adjustment factor based on at least one of a first seasonality input, a first inflation input, or a first quality input associated with a first group specified in the current media plan,
a second cost adjustment factor based on at least one of a second seasonality input, a second inflation input, or a second quality input associated with a second group specified in the current media plan,
a duration of an unexecuted portion of the current media plan,
wherein the duration is divisible into one or more periods of time, and
an unutilized budget for the duration of the unexecuted portion of the current media plan, wherein a first portion of the unutilized budget is allocated to the first group and a second portion of the unutilized budget is allocated to the second group;

obtain a baseline cost parameter associated with a previously implemented baseline media plan;

generate a first predictive baseline cost parameter to predict one or more first metrics associated with the first group,
wherein generating the first predictive baseline cost parameter includes adjusting the baseline cost parameter by the first cost adjustment factor;

generate a second predictive baseline cost parameter to predict one or more second metrics associated with the second group,
wherein generating the second predictive baseline cost parameter includes adjusting the baseline cost parameter by the second cost adjustment factor;

predict one or more first cost metrics associated with the first group specified in the current media plan,
wherein predicting the one or more first cost metrics includes modifying an amount of one or more first budget portions of the unutilized budget by a proportionate amount of the first predictive baseline cost parameter, based on a total number of the one or more first budget portions;

predict one or more second cost metrics associated with the second group specified in the current media plan,
wherein predicting the one or more second cost metrics includes modifying an amount of one or more second budget portions by a proportionate amount of the second predictive baseline cost parameter, based on a total number of the one or more second budget portions;

predict one or more first performance metrics based on modifying the one or more first cost metrics by the first predictive baseline cost parameter;

predict one or more second performance metrics based on modifying the one or more second cost metrics by the second predictive baseline cost parameter;

determine one or more first target cost per point (CPP) values for the first group based on the one or more first cost metrics and the one or more first performance metrics;

determine one or more second target CPP values for the second group based on the one or more second cost metrics and the one or more second performance metrics;

cause an action to be performed based on the one or more first target CPP values and the one or more second target CPP values;

provide a user interface for receiving user input to adjust one or more quality inputs;

receive modified user input associating with adjusting the one or more quality inputs;

dynamically adjust the one or more first cost metrics and the one or more second cost metrics based on receiving the modified user input;

dynamically update the one or more first performance metrics and the one or more second performance metrics based on dynamically adjusting the one or more first cost metrics and the one or more second cost metrics; and dynamically update the one or more target CPP values based on dynamically updating the one or more first performance metrics and the one or more second performance metrics,
wherein the dynamically adjusted one or more first cost metrics and dynamically adjusted the one or more second cost metrics, the dynamically updated one or more first performance metrics and the dynamically updated one or more second performance metrics, and the dynamically updated one or more target CPP values are provided for display in real-time via the user interface, and
wherein the dynamically adjusted one or more cost metrics, the dynamically updated one or more performance metrics, and the dynamically updated one or more target CPP values improve efficiency associated with the device.

18. The non-transitory computer-readable medium of claim 17, wherein the first group is associated with a first demographic in a first country and the second group is associated with the first demographic in a second country.

19. The non-transitory computer-readable medium of claim 17, wherein the first group is associated with a first media channel in a first country and the second group is associated with the first media channel in a second country.

20. The non-transitory computer-readable medium of claim 17, wherein:
the first group is associated with a first country,
the second group is associated with a second country,
the first seasonality input is based on a first seasonality index value associated with the first country,
the first quality input is based on a difference between a first expected key performance indicator (KPI) parameter and a first actual KPI parameter for the first country,
the first inflation input is based on an amount of monetary inflation incurred between execution of the baseline media plan and the current media plan for the first country,
the second seasonality input is based on a second seasonality index value associated with the second country,
the second quality input is based on a difference between a second expected second KPI parameter and a second actual KPI parameter for the second country, and
the second inflation input is based on an amount of monetary inflation incurred between execution of the baseline media plan and the current media plan for the second country.

* * * * *